United States Patent
Edsall et al.

(10) Patent No.: US 9,888,405 B2
(45) Date of Patent: Feb. 6, 2018

(54) NETWORKING APPARATUSES AND PACKET STATISTIC DETERMINATION METHODS EMPLOYING ATOMIC COUNTERS

(71) Applicant: Insieme Networks Inc., San Jose, CA (US)

(72) Inventors: Thomas James Edsall, Los Gatos, CA (US); Satyam Sinha, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 706 days.

(21) Appl. No.: 14/099,742

(22) Filed: Dec. 6, 2013

(65) Prior Publication Data

US 2015/0124631 A1 May 7, 2015

Related U.S. Application Data

(60) Provisional application No. 61/900,340, filed on Nov. 5, 2013, provisional application No. 61/900,228, filed on Nov. 5, 2013.

(51) Int. Cl.
*H04W 28/00* (2009.01)
*H04W 28/02* (2009.01)
*H04L 12/26* (2006.01)

(52) U.S. Cl.
CPC ....... *H04W 28/0231* (2013.01); *H04L 43/026* (2013.01); *Y02B 60/33* (2013.01)

(58) Field of Classification Search
None
See application file for complete search history.

(56) References Cited

U.S. PATENT DOCUMENTS 5,115,431 A  5/1992  Williams et al.
7,539,131 B2  5/2009  Shen
(Continued)

OTHER PUBLICATIONS

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf. org/html/draft-mahalingam-dutt-dcops-vxlan-06, Oct. 2013, pp. 1-24.

(Continued)

*Primary Examiner* — Hassan Phillips
*Assistant Examiner* — Gautam Sharma
(74) *Attorney, Agent, or Firm* — Polsinelli PC

(57) ABSTRACT

Disclosed herein are methods and related apparatuses for determining statistics descriptive of packets received at a particular location on a network out of a set of packets transmitted on the network, which include transmitting first and second groups of packets on the network, the packets in the first and second groups labeled with first and second labels, respectively (the packets in the second group not in the first group), incrementing first and second packet counters associated with the particular network location in response to packet(s) in the first and second groups, respectively, being received at the network location until all packets in the first and second groups have drained from the network, and using values read from the first and second packet counters to determine a statistic descriptive of the packets received at the particular network location out of those in the first and second groups transmitted on the network.

36 Claims, 6 Drawing Sheets

(56) References Cited

U.S. PATENT DOCUMENTS

| | | | |
|---|---|---|---|
| 7,580,409 B1 | 8/2009 | Swenson et al. | |
| 8,908,691 B2 | 12/2014 | Biswas et al. | |
| 9,106,508 B2 | 8/2015 | Banavalikar et al. | |
| 9,178,715 B2 | 11/2015 | Jain et al. | |
| 9,197,551 B2 | 11/2015 | DeCusatis et al. | |
| 9,325,524 B2 | 4/2016 | Banavalikar et al. | |
| 2002/0136268 A1* | 9/2002 | Gan | H04B 1/715 375/133 |
| 2003/0058837 A1 | 3/2003 | Denney et al. | |
| 2003/0058860 A1 | 3/2003 | Kunze | |
| 2003/0142629 A1* | 7/2003 | Krishnamurthi | H04B 17/0085 370/249 |
| 2003/0223376 A1* | 12/2003 | Elliott | H04J 3/14 370/249 |
| 2004/0111507 A1* | 6/2004 | Villado | H04L 12/2602 709/224 |
| 2005/0073958 A1 | 4/2005 | Atlas et al. | |
| 2005/0201375 A1* | 9/2005 | Komatsu | H04L 43/50 370/389 |
| 2005/0213504 A1* | 9/2005 | Enomoto | H04L 41/142 370/235 |
| 2005/0232227 A1* | 10/2005 | Jorgenson | H04L 41/14 370/351 |
| 2006/0075093 A1* | 4/2006 | Frattura | H04L 41/0681 709/224 |
| 2006/0083179 A1* | 4/2006 | Mitchell | H04L 12/2697 370/252 |
| 2006/0083256 A1* | 4/2006 | Mitchell | H04L 12/18 370/432 |
| 2006/0182036 A1* | 8/2006 | Sasagawa | H04L 1/24 370/242 |
| 2006/0209702 A1* | 9/2006 | Schmitt | H04L 12/24 370/252 |
| 2006/0215572 A1* | 9/2006 | Padhye | H04L 43/0858 370/252 |
| 2006/0215623 A1 | 9/2006 | Lin et al. | |
| 2006/0239204 A1* | 10/2006 | Bordonaro | H04L 41/5009 370/253 |
| 2006/0274657 A1* | 12/2006 | Olgaard | H04L 12/2602 370/235 |
| 2006/0285500 A1* | 12/2006 | Booth, III | H04L 41/5035 370/250 |
| 2007/0016590 A1* | 1/2007 | Appleby | H04L 12/2602 |
| 2007/0053303 A1* | 3/2007 | Kryuchkov | H04L 1/20 370/250 |
| 2007/0058557 A1* | 3/2007 | Cuffaro | H04L 43/087 370/252 |
| 2007/0061451 A1* | 3/2007 | Villado | G06F 9/54 709/224 |
| 2007/0076605 A1* | 4/2007 | Cidon | H04L 12/2697 370/230 |
| 2007/0091795 A1 | 4/2007 | Bonaventure et al. | |
| 2007/0097872 A1* | 5/2007 | Chiu | H04L 12/2697 370/250 |
| 2007/0160073 A1* | 7/2007 | Toumura | H04L 43/028 370/419 |
| 2007/0211625 A1 | 9/2007 | Liu et al. | |
| 2007/0233847 A1* | 10/2007 | Aldereguia | H04L 12/2697 709/224 |
| 2007/0258382 A1* | 11/2007 | Foll | H04L 12/2602 370/252 |
| 2007/0258383 A1* | 11/2007 | Wada | H04L 43/0829 370/252 |
| 2008/0031146 A1* | 2/2008 | Kwak | H04L 41/5003 370/250 |
| 2008/0219173 A1* | 9/2008 | Yoshida | H04L 43/50 370/241.1 |
| 2008/0259809 A1* | 10/2008 | Stephan | H04L 41/142 370/252 |
| 2008/0259925 A1 | 10/2008 | Droms et al. | |
| 2009/0052332 A1* | 2/2009 | Fukuyama | H04L 41/06 370/242 |
| 2009/0116402 A1* | 5/2009 | Yamasaki | H04L 43/024 370/253 |
| 2009/0225671 A1* | 9/2009 | Arbel | H04L 12/2602 370/252 |
| 2009/0271508 A1* | 10/2009 | Sommers | H04L 43/0829 709/224 |
| 2010/0260197 A1 | 10/2010 | Martin et al. | |
| 2011/0268118 A1 | 11/2011 | Schlansker et al. | |
| 2012/0195233 A1 | 8/2012 | Wang et al. | |
| 2012/0314581 A1 | 12/2012 | Rajamanickam et al. | |
| 2013/0227108 A1 | 8/2013 | Dunbar et al. | |
| 2013/0250951 A1 | 9/2013 | Koganti | |
| 2014/0006549 A1 | 1/2014 | Narayanaswamy et al. | |
| 2014/0043972 A1 | 2/2014 | Li | |
| 2014/0050223 A1 | 2/2014 | Foo et al. | |
| 2014/0269705 A1 | 9/2014 | DeCusatis et al. | |
| 2014/0328206 A1* | 11/2014 | Chan | H04L 43/0829 370/253 |
| 2015/0010001 A1 | 1/2015 | Duda et al. | |
| 2015/0124611 A1 | 5/2015 | Attar et al. | |
| 2015/0124817 A1 | 5/2015 | Merchant et al. | |
| 2015/0124826 A1 | 5/2015 | Edsall et al. | |
| 2015/0127797 A1 | 5/2015 | Attar et al. | |
| 2016/0036697 A1 | 2/2016 | DeCusatis et al. | |

OTHER PUBLICATIONS

International Search Report and Written Opinion dated Feb. 18, 2015, issued in Application No. PCT/US14/63568.

Khasnabish, et al., "Mobility and Interconnection of Virtual Machines and Virtual Network Elements; draft-khasnabish-vmmi-problems-03.txt," Network Working Group, Dec. 30, 2012, pp. 1-29.

Narten, et al., "Problem Statement: Overlays for Network Virtualization," draft-ietf-nvo3-overlay-problem-statement-04.txt11, Internet Engineering Task Force, Jul. 31, 2013, pp. 1-24.

U.S. Appl. No. 14/530,550, titled "Network Fabric Overlay," by Edsall et al., filed Oct. 31, 2014.

Candy, K. Mani, et al. "Distribution Snapshots: Determining Global States of Distributed Systems," ACM Transaction on Computer Systems, Feb. 1985, vol. 3, No. 1, pp. 63-75.

Office Action issued in U.S. Appl. No. 14/301,239, dated Nov. 5, 2015..

Office Action issued in U.S. Appl. No. 14/099,742, dated Jan. 29, 2016.

Chandy, K. Mani, et al., "Distribution Snapshots: Determining Golbal States of Distributed Systems," ACM Transaction on Computer Systems, Feb. 1985, vol. 3, No. 1, pp. 63-75.

U.S. Appl. No. 14/450,172, titled "Service Tag Switching," by Yadav et al., filed Aug. 1, 2014.

Office Action issued in U.S. Appl. No. 14/099,742, dated Dec. 21, 2015.

U.S. Appl. No. 14/086,803, titled "Hardware Based Fast Convergence for Network Failures," by Yadav et al., filed Nov. 21, 2013.

Office Action issued in U.S. Appl. No. 14/099,742, dated May 6, 2015.

Aslam, F. et al., "NPP: A Facility Based Computation Framework for Restoration Routing Using Aggregate Link Usage Information," Proceedings of QoS-IP: quality of service in multiservice IP network, Feb. 2005, pp. 150-163.

Kodialam, M. et al., "Dynamic Routing of Locally Restorable Bandwidth Guaranteed Tunnels using Aggregated Link Usage Information," Proceedings of IEEE INFOCOM, 2001, vol. 1, pp. 376-385.

Li, L. et. al, "Routing Bandwidth Guaranteed Paths with Local Restoration in Label Switched Networks," IEEE Journal on Selected Areas in Communications, Feb. 7, 2005, vol. 23, No. 2, pp. 437-449.

Pan, P. et al., "Fast Reroute Extensions to RSVP-TE for LSP Tunnels," RFC-4090. May 2005, pp. 1-38.

Raza, S. et al., "Online routing of bandwidth guaranteed paths with local restoration using optimized aggregate usage information," IEEE-ICC '05 Communications, May 2005, vol. 1, pp. 201-207.

(56) References Cited

OTHER PUBLICATIONS

Final Office Action issued in U.S. Appl. No. 14/099,742, dated Nov. 13, 2015.
Office Action issued in U.S. Appl. No. 14/099,742, dated Mar. 7, 2016.
Office Action issued in U.S. Appl. No. 14/530,550, dated May 24, 2016.
Office Action issued in U.S. Appl. No. 14/530,550, dated Dec. 26, 2015.
Sinha, Shan et al., "Harnessing TCP's burstiness with flowlet switching," Nov. 2004, 6 pages.
Final Office Action issued in U.S. Appl. No. 14/099,742, dated May 27, 2016.
Final Office Action issued in U.S. Appl. No. 14/301,239, dated Jun. 16, 2016.
Final Office Action issued in U.S. Appl. No. 14/530,550, dated Jun. 23, 2016.

* cited by examiner

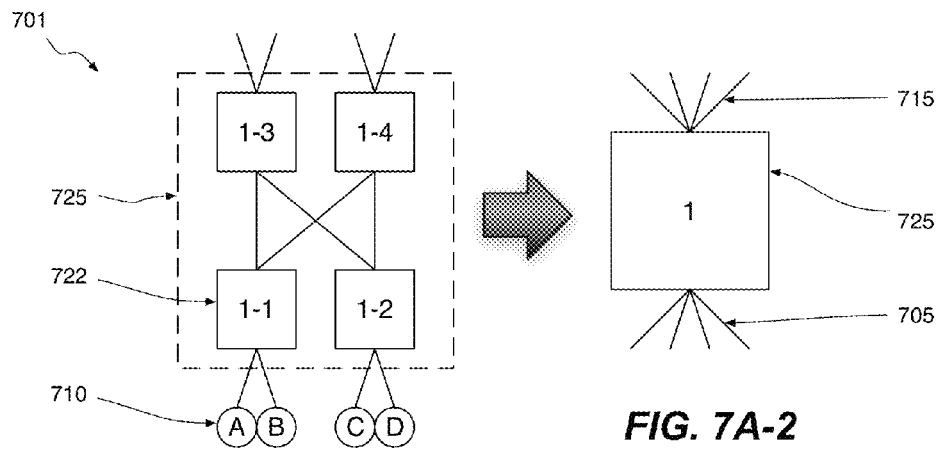
FIG. 7A-1
FIG. 7A-2
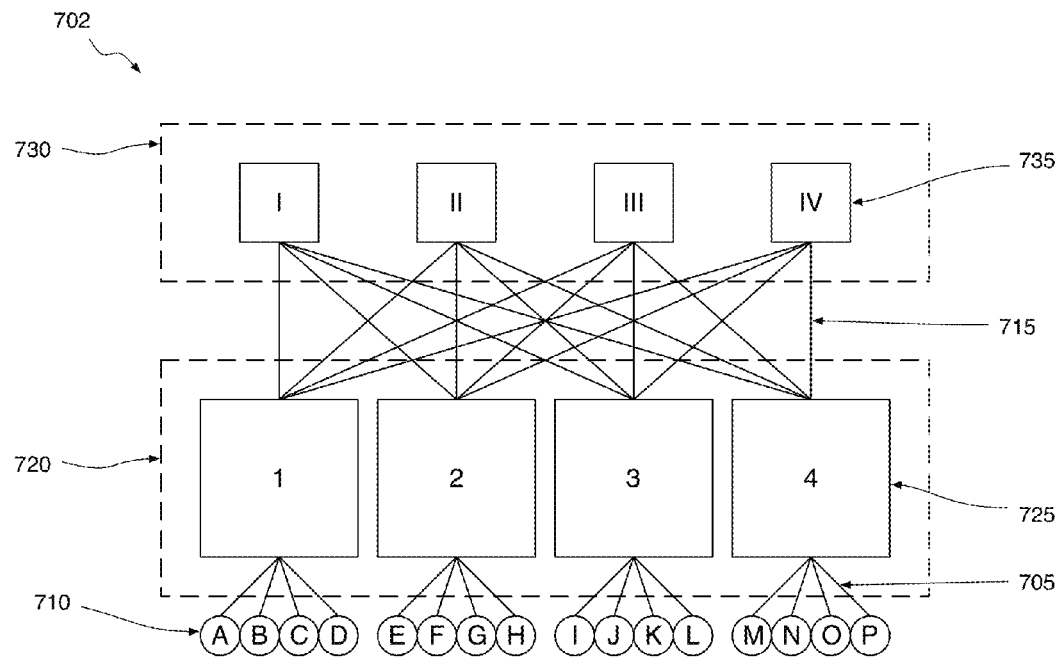
FIG. 7B

… (1)

NETWORKING APPARATUSES AND PACKET STATISTIC DETERMINATION METHODS EMPLOYING ATOMIC COUNTERS

CROSS-REFERENCES TO RELATED APPLICATIONS

This application claims priority to: U.S. Provisional Pat. App. No. 61/900,340, filed Nov. 5, 2013, title "NETWORKING APPARATUSES AND PACKET STATISTIC DETERMINATION METHODS EMPLOYING ATOMIC COUNTERS"; and
U.S. Provisional Pat. App. No. 61/900,228, filed Nov. 5, 2013, titled "NETWORK FABRIC OVERLAY";
each of which is hereby incorporated by reference in its entirety for all purposes.

FIELD OF THE INVENTION

This disclosure relates to computer networking apparatuses and to methods and apparatuses for determining statistics relating to traffic flow in computer networks.

BACKGROUND

Reliable and consistent statistics relating to network traffic flow are important diagnostic tools in the operation of the modern datacenter. For instance, several classes of network errors and even failures include forwarding errors, very low rate packet loss that isn't accounted for by the device that is actually losing the packet, which may be identified if accurate packets statistics are available. However, current packet (and/or byte) counting methodologies and/or devices often fail to provide an accurate and consistent assessment of packet flow across a network, which negatively impacts the ability of this type of statistical information to serve the desired diagnostic purposes.

SUMMARY

Disclosed herein are methods of determining statistics descriptive of the packets received at a particular location on a network out of a set of packets transmitted on the network. The methods may include transmitting a first group of packets on the network, each packet in the first group labeled with a first label, and transmitting a second group of packets on the network, each packet in the second group labeled with a second label, wherein the packets in the second group are not in the first group. The methods may further include incrementing a first packet counter associated with a particular network location in response to a packet or packets in the first group being received at the particular network location until all packets in the first group have drained from the network, incrementing a second packet counter associated with the particular network location in response to a packet or packets in the second group being received at the particular network location until all packets in the second group have drained from the network, reading the value of the first packet counter, reading the value of the second packet counter and using the values read from the first and second packet counters to determine a statistic descriptive of the packets received at the particular network location out of those in the first and second groups transmitted on the network. In some embodiments, the second group of packets is transmitted after the first group. In some embodiments, the particular network location coincides with the location of a switch on the network. In some embodiments, the packets are encapsulated and the packet header providing the encapsulation carries either the first or second label.

In some embodiments, the methods may further include transmitting a third group of packets on the network, after reading the value of the first packet counter, each packet in the third group labeled with the first label, transmitting a fourth group of packets on the network, after reading the value of the second packet counter, each packet in the fourth group labeled with the second label, incrementing the first packet counter associated with the particular network location in response to a packet or packets in the third group being received at the particular network location until all packets in the third group have drained from the network, incrementing the second packet counter associated with the particular network location in response to a packet or packets in the fourth group being received at the particular network location until all packets in the fourth group have drained from the network, reading the value of the first packet counter, and again reading the value of the second packet counter, and using both values read from the first packet counter and from the second packet counter to determine a statistic descriptive of the packets received at the particular network location out of those in the first, second, third, and fourth groups transmitted on the network.

In some embodiments, the statistic is indicative of the number of packets received at the particular location on the network out of the total number of packets in the first and second groups transmitted on the network. In some embodiments, the first packet counter is incremented by a number indicative of the amount of data received in a packet or packets having the first label, and the second packet counter is incremented by a number indicative of the amount of data received in a packet or packets having the second label. In certain such embodiments, the number indicative of the amount of data received in a packet or packets having the first label is the number of bytes contained in the packet or packets having the first label, the number indicative of the amount of data received in a packet or packets having the second label is the number of bytes contained in the packet or packets having the second label, and the statistic is indicative of the number of bytes received at the particular location on the network out of the total number of bytes in the first and second groups of packets transmitted on the network.

In some embodiments, more than two labels may be used to label packets. Thus, in some embodiments, the methods may further include transmitting a third group of packets on the network, each packet in the third group labeled with a third label, wherein the packets in the third group are not in either the first or second groups, incrementing a third packet counter associated with the particular network location in response to a packet or packets in the third group being received at the particular network location until all packets in the third group have drained from the network, and reading the value of the third packet counter, wherein the value read from the third packet counter is also used in determining the statistic, in addition to the values read from the first and second packet counters. Likewise, in some embodiments, the methods may further include transmitting a fourth group of packets on the network, each packet in the fourth group labeled with a fourth label, wherein the packets in the fourth group are not in either the first, second, or third groups, incrementing a fourth packet counter associated with the particular network location in response to a packet or packets in the fourth group being received at the particular network location until all packets in the fourth group have drained from the network, and reading the value of the fourth packet counter, wherein the value read from the fourth packet counter is also used in determining the statistic, in addition to the values read from the first, second, and third packet counters.

In some embodiments, the determined statistic may be particularly descriptive of the packets matching a particular criteria received at the particular network location. In some embodiments, the first packet counter is only incremented in if the packet or packets in the first group received at the network location match the criteria, and the second packet counter is only incremented if the packet or packets in the second group received at the network location match the criteria. In some embodiments, the criteria may be whether a packet's header designates a particular source IP address, and/or whether a packet's header designates a particular destination IP address, and/or whether a packet's header designates a particular port number, and/or whether the packet's header designates a particular virtual network identifier.

Also disclosed herein are network devices for sending and receiving packets of data on a network. In some embodiments, the network device may be a leaf network device or a spine network device in a leaf-spine network. The network devices may include a plurality of ports through which packets of data are sent and received, one or more packet labelers for labeling packets with a label from a set of labels before sending the packets out through the plurality of ports, first and second packet counters, and packet characterization logic. The set of labels may include first and second labels, the first packet counter may increment in response to the network device receiving a packet or packets having the first label through one of the plurality of ports, and the second packet counter may increment in response to the network device receiving a packet or packets having the second label through one of the plurality of ports. The packet characterization logic of the network device may read values from the first and second packet counters and use the values to determine a statistic descriptive of the packets received by the network device.

In some embodiments, the statistic determined by the packet characterization logic is indicative of the number of packets received by the network device. In some embodiments, the first packet counter of the network device may increment by a number indicative of the amount of data received in a packet or packets having the first label, and the second packet counter of the network device may increment by a number indicative of the amount of data received in a packet or packets having the second label. In certain such embodiments, the number indicative of the amount of data received in a packet or packets having the first label may be the number of bytes contained in the packet or packets having the first label, the number indicative of the amount of data received in a packet or packets having the second label may be the number of bytes contained in the packet or packets having the second label, and the statistic determined by the packet characterization logic may be indicative of the number of bytes received by the network device.

In certain network device embodiments, the set of labels further comprises a third label and the network device may further include a third packet counter which increments in response to the network device receiving a packet or packets having the third label through one of the plurality of ports. In certain such embodiments, the packet characterization logic of the network device may read values from the third packet counter, and use the value read from the third packet counter to determine the statistic along with the first and second values read from the first and second packet counters.

In some embodiments, the statistic determined by the packet characterization logic may be particularly descriptive of the packets received by the network device which match a particular criteria, and the first packet counter may only increment when a received packet or packets having the first label match the criteria, and also, the second packet counter may only increment when a received packet or packets having the second label match the criteria. In certain such embodiments, the criteria may be whether a packet's header designates a particular source IP address, and/or whether a packet's header designates a particular destination IP address, and/or whether a packet's header designates a particular port number, and/or whether the packet's header designates a particular virtual network.

Also disclosed herein are networks for transmitting packets of data between a plurality of end devices. The networks may include two or more leaf network devices for connecting to the plurality of end devices, two or more spine network devices for connecting to the leaf network devices, one or more packet labelers for labeling packets with a label from a set of labels including a first label and a second label, a first packet counter, a second packet counter, and packet characterization logic. The first packet counter may be associated with a particular network device on the network and it may increment in response to the network device receiving a packet or packets having the first label, and the second packet counter may also be associated with the particular network device and may increment in response to the network device receiving a packet or packets having the second label. The packet characterization logic may read values from the first and second packet counters and use the values to determine a statistic descriptive of the packets received by the particular network device.

In some network embodiments, the statistic determined by the packet characterization logic may be indicative of the number of packets received by a particular network.

In some embodiments, the first packet counter may increment by a number indicative of the amount of data received in a packet or packets having the first label, and the second packet counter may increment by a number indicative of the amount of data received in a packet or packets having the second label. In certain such embodiments, the number indicative of the amount of data received in a packet or packets having the first label may be the number of bytes contained in the packet or packets having the first label, the number indicative of the amount of data received in a packet or packets having the second label may be the number of bytes contained in the packet or packets having the second label, and the statistic determined by the packet characterization logic may be indicative of the number of bytes received by the particular network device.

In some network embodiments, the statistic determined by the packet characterization logic may be particularly descriptive of the packets received by the particular network device which match a particular criteria, and the first packet counter may only increment when a received packet or packets having the first label match the criteria, and also, the second packet counter may only increment when a received packet or packets having the second label match the criteria. In certain such embodiments, the criteria may be whether a packet's header designates a particular source IP address, and/or whether a packet's header designates a particular destination IP address, and/or whether a packet's header designates a particular port number, and/or whether the packet's header designates a particular virtual network.

BRIEF DESCRIPTION OF THE DRAWINGS

FIGS. 7A-1, 7A-2, and 7B schematically illustrate how a simple example of a 3-tier leaf-spine network may be built from just 4-port switches.

DETAILED DESCRIPTION

Figure 1:
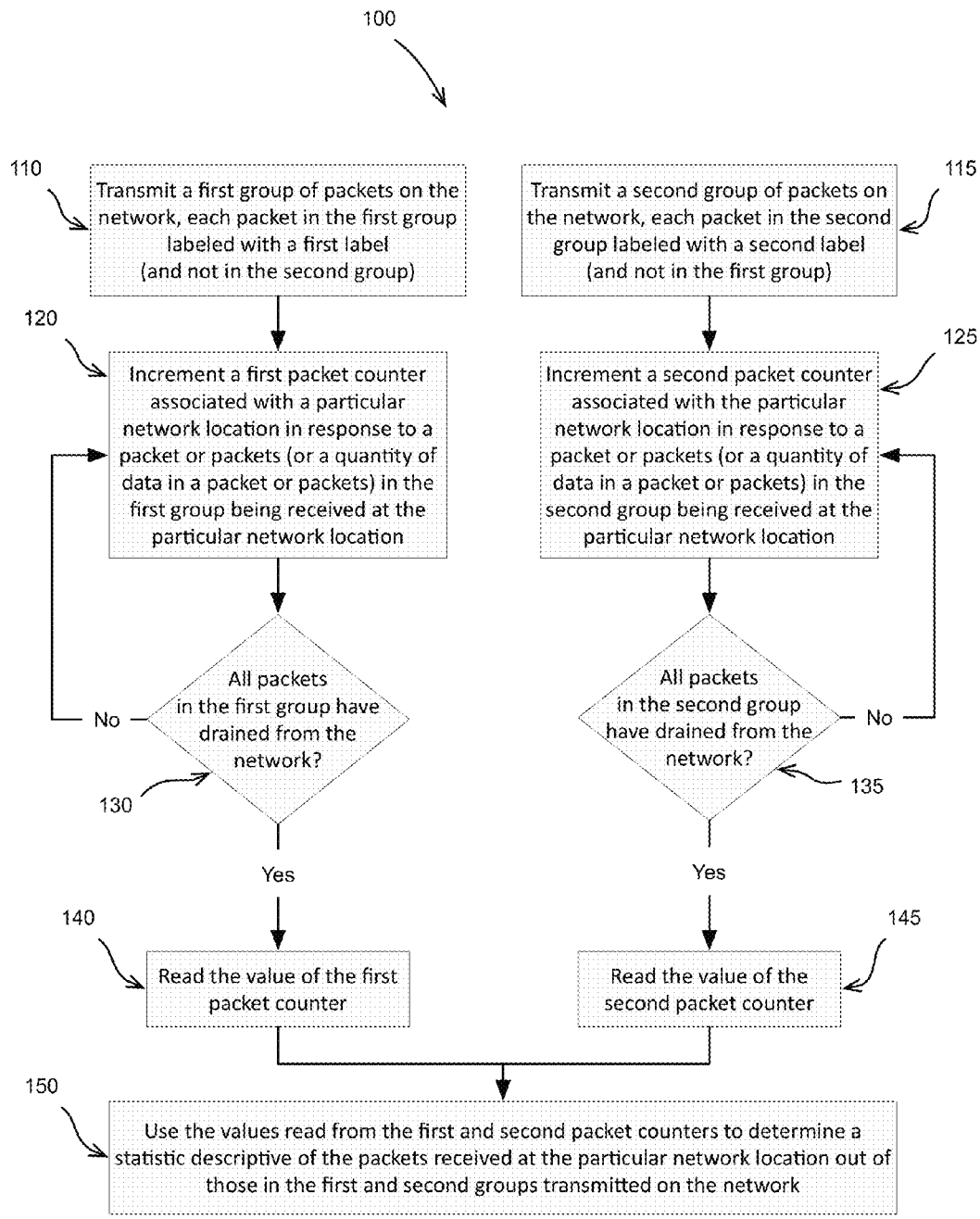
FIG. 1 displays a flowchart illustrating some of the packet counting methods and operations disclosed herein.

In the following disclosure, numerous specific embodiments are set forth in order to provide a thorough understanding of the inventive concepts disclosed herein. However, it will be appreciated by those skilled in the art that in many cases the disclosed concepts may be practiced with or without certain specific details, such as by the substitution of alternative elements or steps, or by the omission of certain elements or steps, while remaining within the scope and spirit of this disclosure. Furthermore, where certain processes, procedures, operations, steps, elements, devices, modules, components, and/or systems are already well-known to those skilled in the art, they may not be described herein in as great of detail as is necessarily possible, so that the inventive aspects of this disclosure are not unnecessarily obscured.

Despite the fact that reliable and consistent statistics relating to network traffic flow are potentially valuable diagnostic tools in the operation of the modern datacenter, current packet (and/or byte) counting methodologies and devices typically fail to collect packet statistics in a consistent or concerted fashion which limits the usefulness of the statistics so generated for troubleshooting network operational issues.

For example, in a common scenario, a network operator may want to determine how many packets (or bytes) originating at point A on a network successfully reach their destination at point B on a network, or equivalently, how many packets (or how many bytes) are dropped traversing the network between origination point A and destination point B. In current networks, a packet counter associated with point A on the network will increment when a packet reaches point A, and a packet counter associated with point B on the network will increment when a packet reaches point B. However, a comparison of these packet counts for purposes of determining the number of dropped packets between points A and B is hindered first by the fact that the two packet counters cannot typically be read at exactly the same time, and second, by the fact that even if the packet counters at points A and B are read simultaneously, if the network is active, there will likely be packets-in-flight between points A and B which, since they have not yet reached point B, will have not yet been counted by the packet counter associated with point B. As a result, in this scenario, the values read from packet counters A and B will typically be inconsistent, limiting the usefulness of comparing these values.

It is noted that the atomic counters disclosed herein (and label-specific packet counters as described below) may, depending on the embodiment, increment in terms of the number of packets or by a number indicative of the amount of data received in the packets (e.g., number of bytes, or some other unit of data/size). Thus, a value read from a packet counter may be indicative of the number of packets received at the network location associated with that packet counter, or it may be more specifically indicative of the amount of data represented by the packets received at the network location associated with the packet counter. In some embodiments, atomic counters may keep two counts, a count for the number of packets received and a count for the amount of data received (e.g., in bytes), and in such embodiments, a value may be read to indicate the number of packets received another value may be read to indicate the amount of data received (e.g., in bytes). Nevertheless, consistent packet counting is desirable whether packet counters increment and report values according to the number of packets or the amount of data received.

Accordingly, disclosed herein are packet counters, referred to herein as atomic counters, which may be distributed at various locations across a network, and which when read yield consistent packet counts (whether in terms of number of packets or amount of data), no matter how much distance or latency separates the counters in the network. Related to these atomic counters are associated methods for determining a statistic descriptive of the packets received at a particular location on a network out of a set of packets transmitted on the network.

FIG. 1 provides a flowchart illustrating certain such methods 100. As shown in the figure, in some embodiments, the methods 100 involve transmitting a first group of packets on the network (block 110) labeled with a first label, and transmitting a second group of packets—which are not in the first group—on the network (block 115) labeled with a second label. The packets then propagate across the network, and when they are received at the particular location on the network about which packet statistics are sought, packet counters associated with that location are incremented. Specifically, a first packet counter associated with that location is incremented in response to a packet or packets in the first group being received (block 120), and a second packet counter associated with that location is incremented in response to a packet or packets in the second group being received (block 125). (However, the first packet counter is not incremented in response to a packet in the second group being received, and vice versa, the second packet counter is not incremented in response to a packet in the first group being received.) As indicated above, depending on whether statistics are desired in terms of number of packets received or amount of data received (e.g., number of bytes), the packet counters may be incremented according to the number of packets having a certain label, or they may be incremented by a number indicative of the amount of data (e.g., the number of bytes) received in a packet or packets having a certain label.

The incrementing of the first and second packet counters continues until all packets in the first and second groups have drained from the network. Thus, as shown in FIG. 1, if at block 130 not all packets in the first group have drained from the network, the method returns to block 120, and likewise, if at block 135 not all packets in the second group have drained from the network, the method returns to block 125. In some embodiments, the amount of time which as passed since the last packet in a particular group of packets was transmitted on the network is used as a basis for assessing whether all packets in the particular group have drained from a network. For instance, a network may typically have a known latency—i.e., roughly the maximum time it may take a packet to traverse the network from an arbitrary ingress point to an arbitrary egress point—and if a set time interval at least as great as this latency has passed since the last packet in a particular group was transmitted, the atomic counters across the network may operate by inferring that all packets in that particular group have drained from the network. In other embodiments, a configuration/methodology may operate by inferring that all packets in a particular group have drained from the network if a certain time interval has expired since the last time a packet having the label associated with the particular group was counted (or detected by some other means) traversing the network. In still other embodiments, a statistical assessment based on the number of packets counted at the atomic counters may be used to determine whether it may be inferred that all transmitted packets in a given group have drained from the network. More generally, an apparatus or methodology may operate by employing a combination of the foregoing techniques to assess whether all packets have drained from the network.

In some embodiments, an atomic counting methodology or apparatus may operate by inferring that all packets in a particular group have drained from the network if a time interval has passed since the last packet in the particular group was transmitted equal to the network's known latency multiplied by some factor. Note that the latency can either be measured directly using timestamps and a common synchronization of time across the switches doing the counting, or it can be bounded to be no greater than the worst case queuing and forwarding latency across the network. In any event, the time interval may be chosen to be larger than the network's known/approximated maximum latency by a factor such as 10 or 100. In some embodiments, the factor which multiplies the network's known maximum latency to determine the time interval for switching labels may be in a range between about 2 and 10, or between about 10 and 25, or between about 25 and 100, or between 100 and 1000, or between about 1000 and 10,000. For example, typical latencies in a two-level fat-tree topology in a data center are in the 10's of milliseconds—e.g., the 30-50 ms range. Corresponding time intervals used for switching packet labels are oftentimes of the order of single digit seconds (and may be software driven). (E.g. 50 ms (latency)×100 (said factor)=5 seconds (time interval for switching packet labels.)

Yet another way to determine that all the packets have drained from a network is to mark the last packet sent out on each possible path and with each possible QoS (quality of service) level and when all of the marked packets have been received, it may be inferred that the network has been drained.

Once all packets in the first and second groups have drained from the network, values are read from the first or second packet counters (blocks 140 and 145, respectively) and used to determine a statistic (block 150) descriptive of the packets received at this network location, which is in reference to the set of packets in the first and second groups transmitted on the network. It is noted that the statistic may be indicative of the number of packets received at the particular location on the network out of the total number of packets in the first and second groups transmitted on the network, or more particularly, the statistic may be indicative of the number of bytes (or some other appropriate unit of data size) received at the particular location on the network out of the total number of bytes (or some other unit) in the first and second groups of packets transmitted on the network. Note that in the context of a leaf-spine network fabric as described in U.S. Provisional Pat. App. No. 61/900,228, filed Nov. 5, 2013, titled "NETWORK FABRIC OVERLAY" (incorporated by reference above in its entirety for all purposes), a location on the network may be leaf network device or a spine network device. A 'byte' is one appropriate unit for measuring amount of data transmitted, but other units of course could be used instead, number of 'bits,' for example, as is readily appreciated by one skilled in the art.

In some embodiments, one aspect of these methodologies is that although the packet counters are updated or incremented as packets arrive, the counters are only read at particular intervals (or equivalently a requested read is delayed until a particular time interval) in order to allow all packets having a certain label to drain from the network. In this manner, the values read from all the counters on the network are representative of a uniform set of packets, assuming no packets have been dropped, and if packets have been dropped, the values read from the counters may be compared to provide an indication of how many packets (or how much data) has been dropped (as described above). During this drain period, it is still desirable for the network to remain capable of actively accepting new traffic, and to allow for this, new packets entering the network are given a different label (a second label, which is distinct from the first label), as described above and shown in FIG. 1, so that the new packets entering the network can be distinguished from the packets draining from the network (which possess the first label). Thus, in order to avoid missing counts associated with these new packets having the second label, two sets of counters are kept; and while one set is being read with respect to a first set of packets having a first label which have already drained from the network, a second set may be incremented while a second set of packets having a second label drain from the network, and vice versa. The two sets of packet counters make a set of label-specific packet counter pairs, and a given pair associated with a given location on the network collectively, optionally along with other components (such as a TCAM as described below), would be referred to as a single atomic counter. It should also be noted that an atomic counter may have more than two label-specific packet counters in embodiments where there are more than two packet labels (as described in more detail below).

Figure 2:
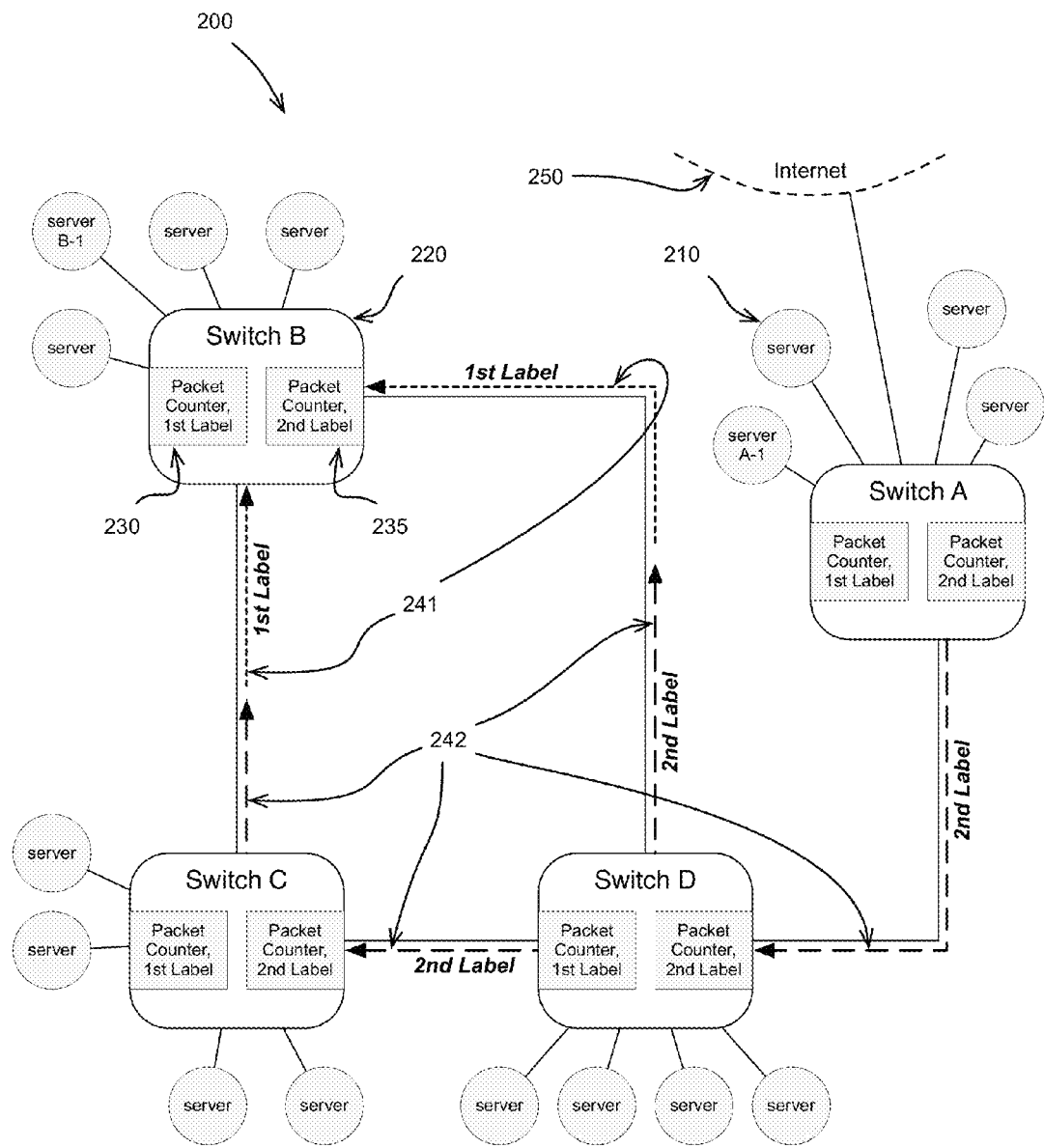
FIG. 2 schematically illustrates an embodiment of a network utilizing atomic counters.

Related to the foregoing methodologies, also disclosed herein are networks for transmitting packets of data between a plurality of end devices, which include packet characterization logic which reads values from packet counters and uses the values to determine a statistic descriptive of the packets received by a particular network device on the network. One embodiment of a network utilizing atomic counters is schematically illustrated in FIG. 2. FIG. 2 schematically illustrates a simple network 200 including four interconnected switches 220, labeled "Switch A," "Switch B," "Switch C," and "Switch D," a connection to the Internet 250 though Switch A, and a plurality of dataservers 210 serving as non-limiting examples of end devices, each dataserver 210 directly connected to the network through one of the four switches, A, B, C, or D. Associated with each switch is a packet counter pair consisting of a first packet counter 210 for counting packets having a first label and a second packet counter 215 for counting packets having a second label.

The network 200 is depicted in FIG. 2, via the dashed arrows, as actively transmitting packets between a server connected to Switch A, e.g. server A-1, and a server connected to Switch B, e.g. server B-1. As shown in the figure, some of the packets carry the first label (depicted by the arrows having the smaller dashes) and some of the packets carry the second label (depicted by the arrows having the larger dashes). In particular, a first group of packets 241 are labeled with the first label, and a second group of packets 242 are labeled with the second label.

FIG. 2 shows the first group of packets 241 arriving at destination Switch B before the second group 242. In some embodiments, this may result from performing the transmission of the second group of packets (in this case, from Switch A) after transmitting the first group of packets (from Switch A). It is to be noted, however, that in some embodiments, transmission of the labeled packets may not be strictly sequential—e.g., some of the packets in the second group 242 may be transmitted from Switch A prior to transmitting every packet in the first group 241. It should also be noted that arrival at the destination, in this case Switch B, may also not be strictly sequential even if the initial transmission is sequential. For example, if as is shown in FIG. 2, there are multiple routes between originating Switch A and destination Switch B, the same group of packets may be divided along the two routes and packets within the same group may therefore arrive at different times. In this particular example, if some packets in a group take a longer route (e.g., the route through Switch C), then it could potentially take these packets a longer time to drain from the network. Thus, assuming two sequentially transmitted groups of packets are split between two routes having different mean transit times, it is possible that some of the packets in the first group which take the longer route may arrive after some of the packets in the second group which take the shorter route.

In some embodiments, packets transmitted on a network employing atomic counters may receive their labels at the network device or switch serving as the packets' ingress point to the network—e.g., the switch which connects to the network the server whose running applications are generating the packets. Thus, in the packet transmission scenario depicted in FIG. 2, the packets originate from server A-1, travel to Switch A which serves as the ingress point to the network, Switch A then labels the packets with either first or second labels, and finally transmits the packets on the network.

In some embodiments, the labels applied to packets at the ingress points to the network may be part of a packet encapsulation scheme such as VXLAN whose application to packets at network ingress points and stripping from packets at network egress points creates a virtualized overlay network. In networks implemented as having an overlay, the ingress and egress points where the encapsulation is applied are often referred to as tunnel encapsulation points (TEPs), which are more fully described in U.S. Provisional Pat. App. No. 61/900,228, filed Nov. 5, 2013, titled "NETWORK FABRIC OVERLAY" (incorporated by reference above in its entirety for all purposes). Thus, in network architectures which provide a virtualized overlay network, the packet header providing the encapsulation may be used to carry the first or second labels. In some embodiments, the label carried in the packet header may consist of a single marker bit which is even (0) or odd (1) to represent the two different labels, whereas in other embodiments, a more complicated labeling mechanism may be employed, such as those described below. However, in other embodiments where a packet encapsulation scheme is employed, the packet label may be carried in a field of the packet which is not part of a packet encapsulation header. In still other embodiments, operation of the network may not employ an encapsulation scheme, but the atomic counter methods and apparatuses described herein may still be employed as long as some field of the packets to be counted may be used to carry the packet label.

In other embodiments, instead of packet labels being applied at the network devices connecting the servers—e.g., switches 220 in FIG. 2—the packet labels may be applied by the servers themselves. For instance, server virtualization is currently quite commonly employed in datacenters wherein a single physical server may, through the use of virtualization technology, support multiple virtual servers (which run atop/in an abstraction/virtualization layer created by what is oftentimes referred to as a "hypervisor"). When virtual servers are run in a virtualization layer, as described in detail in U.S. Provisional Pat. App. No. 61/900,228, filed Nov. 5, 2013, titled "NETWORK FABRIC OVERLAY" (incorporated by reference above in its entirety for all purposes), the virtualization layer may also provide a virtual switch (V-Switch) which may provide the aforementioned encapsulation to the packets transmitted on the network by the virtual servers. In this scenario, a packet label may be part of the encapsulation, and if the overlay network is extended using V-Switches into the server virtualization layer, the V-Switch may thus also apply the packet labels to each packet transmitted on the overlay network. As such, packet labeling can be understood as being performed by a packet labeler component of a TEP, whether the TEP works at the network device level (e.g., at the switches), or at the end device level (e.g., via V-Switches running in a virtualization layer on the end devices). Likewise, a V-Switch at the destination server may function to remove the encapsulation and thus the packet label. In this manner, a V-Switch at a transmitted packet's destination may also function as a TEP, again, as described in detail in US Provisional Pat. App. No. 61/900,228, filed Nov. 5, 2013, titled "NETWORK FABRIC OVERLAY" (incorporated by reference above in its entirety for all purposes). However, it should still be understood that even in the context of server virtualization and extension of the overlay network into the server virtualization layer, in some embodiments, the packet label may reside in a field of the packet distinct from the packet's encapsulation header.

Referring again to FIG. 2, the first packet counters 230 associated with each switch 220 increment in response to the switch receiving a packet or packets having the first label. Likewise, the second packet counters 235 associated with each switch 220 increment in response to the switch receiving a packet or packets having the second label. The first 230 and second 235 packet counters continue to increment until all packets in the first group of packets 241 and the second groups of packets 242, respectively, have drained from the network. Once this occurs, packet characterization logic (not shown in FIG. 2) may read values from the first and second packet counters and use the values to determine a statistic descriptive of the packets received by a particular network device associated with a pair of packet counters, e.g. a switch, or descriptive of packets received at some other network location associated with a pair of packet counters. Note that in some embodiments, a running sum is kept of the values read from the packet counters. When the packet counter associated with the first label is read, it adds it to the sum. Likewise, when the packet counter associated with the second label is read, it adds it to the sum. This sum is a statistic which is descriptive of the packets received at a particular device associated with the pair of packet counters. Also note that the running sum may be accumulated and stored in hardware or software.

During continuous network operation which employs atomic timer methodologies, packet statistics are typically determined on a periodic basis, and to do this, packet transmission on the network typically switches periodically from using one packet label to another in a concerted fashion. This may occur in a network-wide coordinated-in-time manner, such that at each TEP or other defined network location, the particular label which is applied to packets entering the network—e.g., whether the packets' marker bit is set even/0 or odd/1—is the same across the whole network, and when the label is switched—e.g., switched even/0 to odd/1—the switch occurs substantially simultaneously across the entire network.

Figure 3:
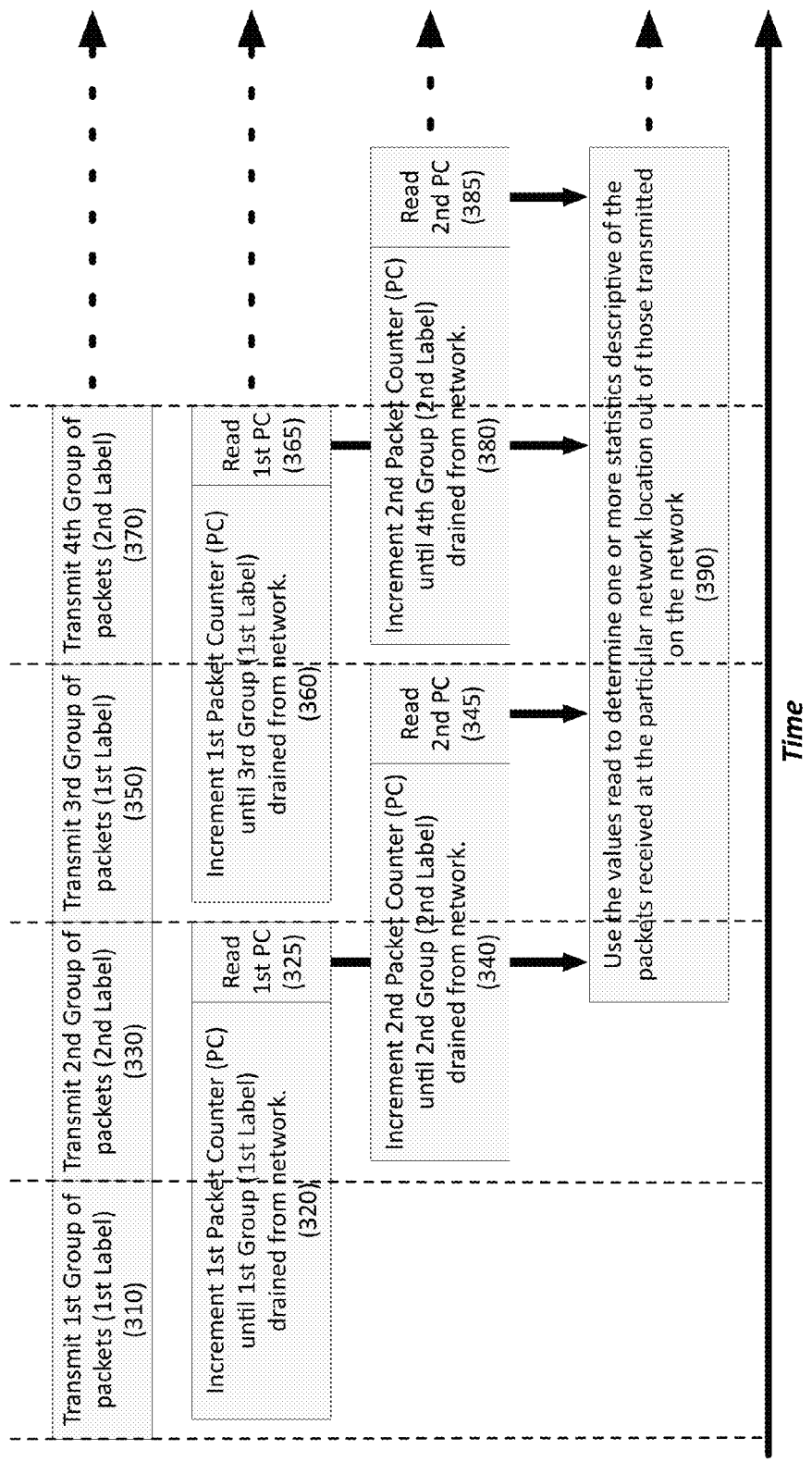
FIG. 3 displays a timing diagram illustrating the transmission of packets, incrementing of packet counters, reading of packet counters, and determination of packet statistics.

FIG. 3 displays a timing diagram illustrating such continuous network operation and periodic determination of packet statistics, specifically over the course of transmitting four groups of packets using two different packet labels. As in FIG. 2, the labels are designated a first label and a second label in FIG. 3—e.g., once again, a bit set even or odd in the packet's encapsulation header.

FIG. 3 shows the four groups of packets having the different labels being transmitted sequentially: as illustrated by the first row of the timing diagram, the first group of packets are transmitted in time block 310, the second group of packets transmitted in time block 330 (which follows block 310), the third group of packets are transmitted in time block 350 (which follows block 330), and the fourth group of packets are transmitted in time block 370 (which follows block 350). The timing diagram illustrates that during continuous network operation, whenever an inbound packet arrives at the network for transmission—whether during time block 310, 330, 350, or 370, and so on—there is a group of packets it can be assigned to and thereby a designated label which can be applied to the inbound packet. Note that the first and third groups of packets are labeled with the first label, and the second and fourth groups of packets are labeled with the second label, illustrating the switching of packet labels described above (appropriate for embodiments employing two types of packet labels). The dashed arrows pointing in the forward time direction illustrate that the entire process shown in FIG. 3 can proceed continuously.

Subsequent to the initiation of transmission of each group of packets on the network, FIG. 3 illustrates that a packet counter will be incremented until the packets in that group have drained from the network. Referring to the second row in FIG. 3, the first packet counter is incremented (at time block 320) shortly after initiating transmission of the first group of packets (at time block 310). (Here, there is schematically indicated to be a slight delay between initial transmission and initial packet counter incrementation, simply because it may take the first transmitted packet a bit of time to traverse the network and reach a packet counter.) The incrementing of the first packet counter continues until all packets in the first group have drained from the network at which point the first packet counter is read (at time block 325). Note that transmission of the second group of packets is now occurring (at time block 330), and that these packets have a different label than those in the first group, which allows the first group of packets having the first label to drain from the network before the first packet counter is read (at time block 325). Also note that transmission (at time block 350) of the third group of packets—which do have the same label as those in the first group—does not begin until the first packet counter is read (at time block 325), and in this manner the value read from the first packet counter (at block 325) is therefore a value characteristic of the first group of packets.

Likewise, shortly after initiating transmission of the third group of packets (at time block 350), the first packet counter is again incremented (at time block 360), and the incrementing continues until all packets from the third group have drained from the network, at which point the first packet counter is again read (this time at time block 365). Once again, it is noted that, at this point, transmission of the fourth group of packets is now occurring (at time block 370), allowing packets having the first label, this time in the third group, to drain from the network, and thus the value read from the first packet counter (at time block 365) is characteristic of the third group of packets—or cumulatively characteristic of the first and third groups of packets if the first packet counter was not reset in between the first and third groups (i.e., between time block 325 and time block 360).

Similarly, with reference to the third row of FIG. 3, the second packet counter is incremented with respect to the second and fourth groups of packets which have the second label, in a complementary fashion to the manner the first packet counter is incremented with respect to the first and third groups of packets which have the first label. Thus, after initiating transmission of the second group of packets (at time block 330), the second packet counter is incremented (at time block 340) until all packets in the second group have drained from the network at which point the second packet counter is read (at time block 345).

Likewise, after initiating transmission of the fourth group of packets (at time block 370), the second packet counter is incremented (at time block 380) until all packets in the fourth group have drained from the network at which point the second packet counter is read (at time block 385). It is noted that during the periods prior to and during the reading of the second packets counter (at time blocks 345 and 385), packets having the first label are now being transmitted on the network, allowing packets having the second label to drain from the network, similar to the complementary scenario described above with respect to the first packet counters and packets having the first label.

FIG. 3 schematically illustrates that the values read from the first packet counter (at timing blocks 325 and 365) and the values read from the second packet counter (at timing blocks 345 and 385) are used to determine a statistic descriptive of the packets received at the particular network location out of those packets transmitted on the network (e.g., during timing blocks 310, 330, 350, and 370). Note that the statistic could be a cumulative statistic calculated with respect to (and corresponding to) the total number of packets transmitted on the network, and so calculated from the values read at each of the timing blocks 325, 345, 365, 385. Or, the statistic could be more granular, and calculated with respect to each group of packets individually, or calculated with respect to a certain number of groups such as two groups of packets at a time. For instance, a statistic descriptive of the packets received at the particular network location out of the third group of packets transmitted on the network may use only the value read from the first packet counter at timing block 365. It is to be understood that the sequence depicted in FIG. 3 continues beyond the four groups of packets specifically displayed in FIG. 3, and so the statistic computed in timing block 390 may be cumulatively descriptive of more than the four groups of packets specifically shown in FIG. 3. Thus, in some embodiments, the statistic may be a statistic which is accumulated over many groups of packets or, more generally, is cumulatively descriptive of many groups of packets. Alternatively, the statistic computed in timing block 390 may be periodically updated/recomputed to correspond to the group of packets which most recently drained from the network (and thus the group most recently fully-counted by the corresponding label-specific packet counter); or periodically updated/recomputed to correspond to some number of the most recently drained groups of packets, such as the most recent 2 groups, or 3 groups, or 4 groups, or 5 groups, or between about 5 and 10 groups, or between about 10 and 50 groups, or between about 50 and 500 groups, etc.

It should be noted with reference to FIG. 3 and to other various portions of this disclosure, that to "transmit" a packet on the network, or when a packet is "transmitted" on the network, refers to the packet entering the network, for example at a tunnel encapsulation point (TEP). Thus, using these terms, packets "traverse" the network and "drain" from the network after they have been "transmitted" on the network, and so for example, the time period represented timing block 310 (transmitting the first group of packets) concludes before the time period represented by timing block 320 (incrementing the first packet counter until the first group of packets drains from the network) concludes. In other contexts, "transmission" may simply refer to the packet moving through or traversing the network, but the meaning will be clear from the context. Thus, unless stated otherwise or it is clear from the context that another definition is appropriate, "transmit," "transmitted," or "transmission" of packets is used herein to refer to packets entering the network.

It should also be noted with respect to FIG. 3, that although the atomic counters, and their corresponding label-specific packet counters, are read in a concerted fashion, they do not need to be read simultaneously, and that the reading of atomic counters across the network will be consistent so long as, for a given labeling cycle, each label-specific packet counter is read after a time sufficient to allow all packets having that label to drain from the network, but before the time where the next group of packets having that same label are introduced onto the network.

To illustrate the utility of the atomic counter devices and methodologies disclosed herein, consider an example of two atomic counters (e.g., each atomic counter having a pair of label-specific packet counters: a first packet counter for counting packets having a first label and a second packet counter for counting packets having a second label) which are configured to count the number of FTP packets sent from a given originating server on a network to a given destination server on the network. Suppose in this example that one atomic counter is located at the FTP packets' entry point (e.g., the point on the network where the server transmitting the packets connects) and the second atomic counter is located near the FTP packets' exit point (e.g., the point on the network where the destination server connects). Then, if the transmitting server sends, for example, 1001 FTP packets across the network (which could consist of many groups of packets having the first label and many groups of packets having the second label), then a simultaneous reading of both atomic counters will yield exactly the same value (the sum of the values read from its pair of label-specific packet counters), so long as no packets were dropped between the two atomic counters as the packets traversed the network. Moreover, if the two atomic counters are read simultaneously, they will yield the same value no matter when the reading occurs, once again in the absence of dropped packets. This is because the values read from the pairs of label-specific packet counters will not include counts associated with any group of packets which has not fully drained from the network, as schematically illustrated by the timing diagram in FIG. 3 (and also the flowchart in FIG. 2). Thus, for instance, if all FTP packets have drained form the network, then a simultaneous reading of the atomic counter at the FTP packets' entry point to the network and the atomic counter at the FTP packets' exit point will both yield the value 1001—i.e., the number of FTP packets originally transmitted. And, if these two atomic counters are read simultaneously before the FTP packets have finished traversing the network, they still will both yield the same (consistent) value, but in this scenario, a value less than 1001. On the other hand, if there are dropped packets, the values read from the two atomic counters may not be the same, but due to the their being incremented consistently, the difference may be used to determine the number of dropped packets or the amount of data represented by the dropped packets between the sending and receiving servers—thus providing the type of diagnostic information not typically available from the packet counters used in current networks.

The network schematically illustrated in FIG. 2 does not embody a leaf-spine network architecture, however, the atomic counters disclosed herein may be employed within the context of a leaf-spine network. For instance, a typical leaf-spine network may include two or more leaf network devices for connecting to a plurality of end devices, servers for example, two or more spine network devices for connecting to the leaf network devices, and a pair of packet counters making up an atomic counter associated with a particular network location and/or network device on the leaf-spine network. For example, the pair of packet counters may be associated with a leaf network device. The packet counters in a leaf-spine network may operate as described above with respect to networks, in general. Leaf-spine network architectures are described in greater detail in U.S. Provisional Pat. App. No. 61/900,228, filed Nov. 5, 2013, titled "NETWORK FABRIC OVERLAY" (incorporated by reference above in its entirety for all purposes).

In some embodiments, packet characterization logic and a pair of packet counters may be components of the network device itself about which packet statistics are sought. Thus, disclosed herein are network devices for sending and receiving packets of data on a network which include first and second packet counters and also packet characterization logic which reads values from the pair of packet counters and uses the values to determine a statistic descriptive of the packets received by the network device. In addition, such a network device may typically include a plurality of ports through which packets of data are sent and received, and one or more packet labelers for labeling packets with the above described first or second labels before sending the packets out through the plurality of ports. The pair of packet counters may increment as described above. Thus, the first packet counter would operate by incrementing in response to the network device receiving a packet or packets having the first label through one of the plurality of ports, and the second packet counter would operate by incrementing in response to the network device receiving a packet or packets having the second label through one of the plurality of ports. Once the packets from each group of packets have drained from the network, the packet characterization logic may read values from the first and second packet counters and use the values to determine a statistic descriptive of the packets received by the network device. In some embodiments, the statistic may be determined by some component outside the network device having the pair of packet counters, and in this case, the values read from the packet counters may be transmitted to this other component so the statistic can be determined.

In the embodiments described above, the atomic counters and related methodologies were in many instances described as functioning with respect to packets being labeled with one of two possible labels, for example, labels consisting of a marker bit in the packet header which could have the value of 0/even or 1/odd. However, atomic counters and related methodologies may also be employed in the context of packet labeling schemes involving more than two labels, such as a packet labeling scheme involving 3 labels, or 4 labels, or 5, or 6, or 7, or 8, or 16, or 32 labels, for example, or a number of labels ranging from 3-8, 8-16, or 16-32.

Thus, for example, in addition to operating with respect to first and second groups of packets having first and second labels, respectively, the atomic counter methods and devices disclosed herein may additionally operate by transmitting a third group of packets on the network having a third label (the packets in the third group not in either the first or second groups), incrementing a third packet counter associated with a particular network location in response to a packet or packets in the third group being received at the particular network location until all packets in the third group have drained from the network, and after the third group of packets have drained from the network, reading the value of the third packet counter. The value read from the third packet counter may then be used in conjunction with the values read from the first and second packet counters with respect to the first and second groups of packets to determine a statistic characteristic of the packets in all three groups.

Likewise, in addition to operating with respect to first, second, and third groups of packets having first, second, and third labels, respectively, the atomic counter methods and devices disclosed herein may additionally operate by transmitting a fourth group of packets on the network having a fourth label (the packets in the fourth group not in either the first, second, or third groups), incrementing a fourth packet counter associated with a particular network location in response to a packet or packets in the fourth group being received at the particular network location until all packets in the fourth group have drained from the network, and after the fourth group of packets have drained from the network, reading the value of the fourth packet counter. The value read from the fourth packet counter may then be used in conjunction with the values read from the first, second, and third packet counters with respect to the first, second, and third groups of packets to determine a statistic characteristic of the packets in all four groups. Of course, with respect to a 3-label or 4-label packet labeling scheme, the labels may be cycled through over the transmission of many groups of packets on the network in a continuous fashion, as described in reference to FIG. 3 with respect to a 2-label packet labeling scheme.

In a labeling scheme involving more than two labels, the labels may consist of two or more bits in a packet header, say n bits, and the number of labels may be the number of values which may be represented by those n bits, i.e. $2^n$. Thus, a 4-label scheme may employ 2 bits in the packet headers and the set of possible labels may be 00, 01, 10, or 11, and similarly for a 8-label scheme involving 3 bits in the packet headers, the labels may be 000, 001, 010, 011, 100, 101, 110, 111, and so on for label schemes involving more than 3-bits.

Figure 4:
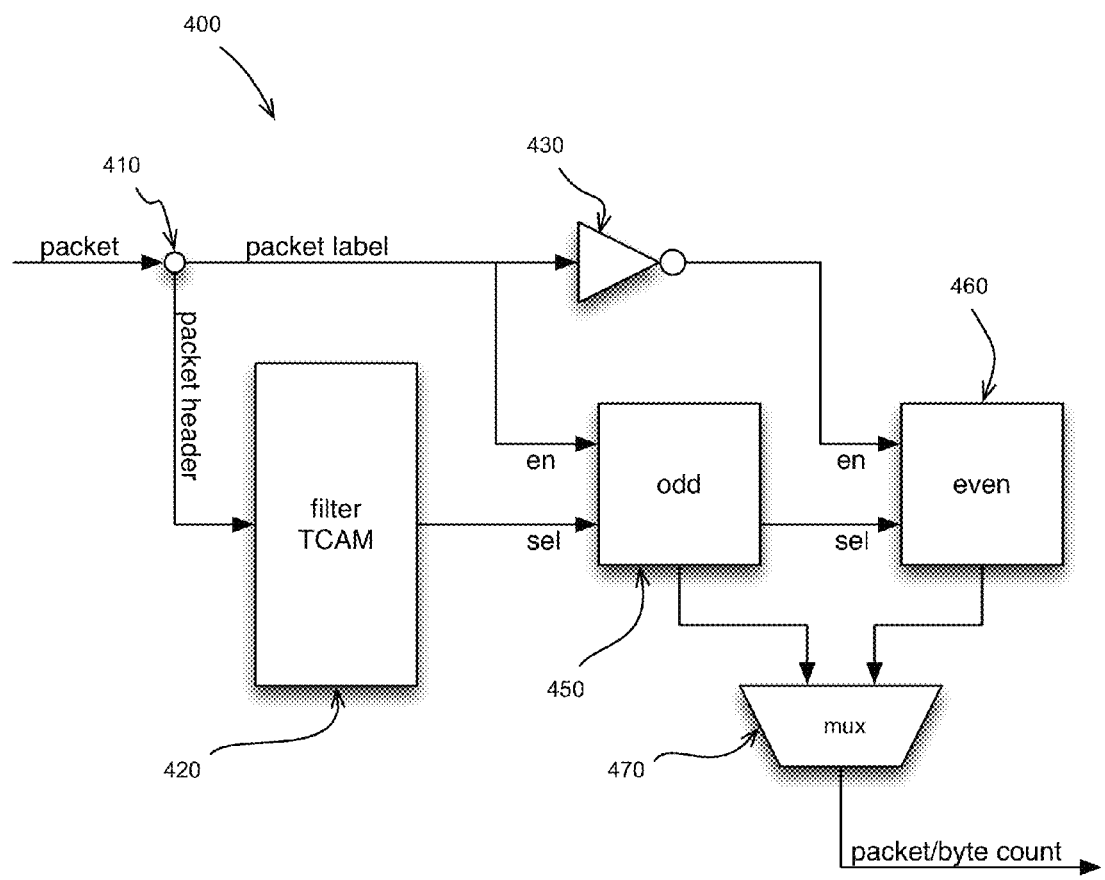
FIG. 4 displays a logic block diagram illustrating the operation of an atomic counter and its pair of label-specific packet counters.

A logic diagram is shown in FIG. 4 which illustrates the handling of single-bit labeled packets by an atomic counter 400 which includes an odd packet counter 450, an even packet counter 460, and a packet filter which, in this particular embodiment, includes a ternary content addressable memory (TCAM) 420. As is understood by one skilled in the art, a TCAM may be viewed as a hardware implementation of an associative array which maps a given input data word to a location in memory having one of three values—typically yes/1, no/0, or "don't care." (A binary CAM maps to one of two values—0 or 1.) Note that while a TCAM may be used to implement a suitable packet filter, in other embodiments, a different packet filter implementation may be employed instead.

A single-bit labeled packet is received by the device 400 on the far left at logic block 410. The labels in the figure indicate that logic block 410 sends the packet header information to the filter TCAM 420 and the packet label to the pair of packet counters 450 and 460, however, it should be understood that, depending on the embodiment, the whole packet may simply be forwarded to these components, and that the labels in the figure simply schematically indicate that the packet header is to be analyzed by the logic in the TCAM, and that the packet label is to be used by the pair of label-specific counters 450 and 460.

In any event, as schematically indicated in the figure, the TCAM 420 analyzes the packet header to determine whether the packet matches one or more particular criteria—as described in greater detail below—and the result of this analysis is passed to the odd and even counters, 450 and 460. The packet label is sent from logic block 410 to the odd packet counter 450 directly, and to the even packet counter 460 after bit-flipping the bit representing the label at logic block 430 (0 is converted to 1, and 1 to 0). Thus, in this particular embodiment, and as schematically illustrated by the connectivity of the logic blocks shown in FIG. 3, the odd counter 450 will increment if the packet label is 1/odd and the TCAM 420 sends a value of 1/true, and the even packet counter 460 will increment if the packet label is 0/even (prior to bit-flipping at block 430) and the TCAM 420 sends a value of 1/true. The counts accumulated by the odd packet counter 450 and the even packet counter 460 (whether packet counts or byte counts) are then combined/summed at block 470, and provided as output from the atomic counter device 400.

Counting Packets (or Bytes) Satisfying a Predetermined Criteria

As mentioned above, and in reference to FIG. 4, in some embodiments, a statistic is desired which is descriptive of the packets received at a particular location on a network out of a set of packets transmitted on the network but is, in particular, descriptive of the packets received at the particular network location which match a particular criteria. To accomplish this, for example, in embodiments where the packets are given one of two labels, the pair of label-specific counters which make up an atomic counter are only incremented in response to packets being received at the location if the packets have the correct label and match the criteria. Thus, considering the example of a first group of packets having the first label, and a second group of packets having the second label, the first packet counter is only incremented for a packet or packets having the first label and matching the particular criteria, and likewise, the second packet counter is only incremented for a packet or packets having the second label and matching the particular criteria. In the particular embodiment schematically illustrated in FIG. 4, TCAM 420 provides the logic which only allows the odd and even packet counters, 450 and 460, to increment if the packet being analyzed matches the criteria designated by TCAM 420.

Depending on the embodiment, the packet-selecting criteria may be any conjunctive or disjunctive combination of any of the following: source IP address, destination IP address, port number, virtual private network identifier, destination MAC address, source MAC address, VLAN, network ID, Layer 3 protocol, Layer 4 protocol, Layer 4 source port number, Layer 4 destination port number, source tunnel encapsulation, destination tunnel encapsulation, source physical port, source logical port, destination physical port, destination logical port, ACL entry, routing entry, or other parameter which may be designated in a packet's header.

For example, the criteria may be whether a packet's header designates a particular source IP address. As another example, the particular criteria may be whether the packet's header designates either a particular source IP address or a particular destination IP address. As yet another example, the particular criteria may be whether the packet's header designates a particular destination IP address and also a particular port number. As another example, the criteria may be whether the packets are HTTP/web packets, FTP packets, etc.

Generally, the packet-selecting criteria may be any arbitrary combination of fields from the packet, and may also include other information such as port the packet came in on or is going out of. If the packet is encapsulated in VxLAN, the selection criteria may also include fields from the VxLAN encapsulation. Thus, typical sample combinations of criteria may include:
 IP source;
 IP source and IP destination;
 IP source and protocol (TCP or UDP) and L4 port number;
 IP destination and protocol (TCP or UDP) and L4 port number;
 IP source and destation and protocol (TCP or UDP) and L4 port number;
 protocol (TCP or UDP) and L4 port number;
 physical port in combination with any of the foregoing;
 source tunnel endpoint address in combination with any of the foregoing;
 destination tunnel endpoint address in combination with any of the foregoing;
 source TEP;
 destination TEP;
 source TEP and destination TEP; or
 packet length in combination with any of the foregoing.

In some embodiments, several statistics corresponding to several different criteria (or combinations of criteria) may be desired. To accomplish this, several atomic counters—each like that schematically illustrated as atomic counter 400 in FIG. 4—may be associated with a given network location, for example, in parallel, so that each may apply its packet filter (e.g., TCAM 420) to the incoming packets in order to identify/filter packets matching one of several desired criteria (or combinations of criteria), and thereby generate each of the desired statistics corresponding to the different criteria (or combinations of criteria). In some embodiments, each atomic counter may have its own associated TCAM to filter packets according to the selected criteria(s) of interest. In other embodiments, multiple atomic counters corresponding to different independently selected criteria(s) of interest may share the same TCAM, that TCAM acting to filter and direct packets matching the criteria(s) of interest to the appropriate atomic counter. In particular, such a TCAM may operate on the inbound packet stream to provide an address of one of many atomic counters depending on the criteria(s) met by the inbound packets, said address(s) thereby indicating which atomic counter gets incremented.

In any event, these configurations may allow a group of atomic counters to count multiple kinds of traffic simultaneously. For example, if one of the criteria is that the packets be FTP traffic, and another of the criteria is that the packets be Web/HTTP traffic, the number of packets or bytes of FTP and Web/HTTP traffic can simultaneously be separately assessed.

In some embodiments where multiple statistics are determined corresponding to different criteria (or combinations of criteria), the atomic counters for determining the statistics may operate sequentially on the incoming stream of packets—e.g., they may be arranged in series. In certain such embodiments, packets matching the criteria applied by each atomic counter (e.g., at the TCAM 420) may be removed from the packet stream so that they are not further processed/counted by any additional downstream atomic counters. In such configurations, in order to determine separate statistics corresponding to each criteria (or combination of criteria), the atomic counters may be arranged in a sequence so that atomic counters applying more selective criteria process the packet stream before those applying less selective criteria. Such an arrangement allows the collective set of atomic counters to provide enough information—via packet and/or byte counts—for processing logic to unambiguously determine the desired statistics.

For example, if the desired statistics are the number of packets having source IP address 172.5.3.4, and also, separately, the number of packets having destination port 80, then the sequence of atomic counters presented in the following table as applying the criteria stated in the table can accumulate packet counts sufficient to compute this information.

| Source IP Address | Destination Port | Atomic Counter Number/Order |
| --- | --- | --- |
| 172.5.3.4 | 80 | 1 |
| Any | 80 | 2 |
| 172.5.3.4 | Any | 3 |

With regards to the table, the total number of incoming packets designating destination port 80 is equal to the sum of the values read from atomic counters 1 and 2, and the total number of incoming packets designating source IP address 172.5.3.4 is equal to the sum of the values read from atomic counters 1 and 3.

It is noted that the logic used to determine whether an incoming packet matches a particular criteria may be implemented in the form of a ternary content-addressable memory (TCAM) as shown in FIG. 4, or it may be implemented in some other form, either in hardware or in software. It is also noted that, depending on the embodiment, the entire atomic counter functionality may be implemented in hardware, or in some mixture of software and hardware, or just in software. For instance, if the network location is a V-Switch running in a hypervisor, an atomic counter associated with the V-Switch may be implemented in software.

Using Atomic Counters with Unlabeled Packets

In some scenarios, packets lacking a label (e.g., not having a marker bit set in their packet header) may be transmitted onto, and traverse, a network having atomic counters at one or more locations. For instance, if the packets lack a VXLAN encapsulation, they may not carry a label. When this occurs, the atomic counters on the network cannot update their label-specific packet counters on a per-packet basis. However, the atomic counters can be configured to nevertheless count unlabeled packets (or bytes) by, for example, incrementing one particular label-specific packet counter in response to an unlabeled packet reaching the network location associated with the atomic counter—which amounts to the atomic counters operating as if each unlabeled packet corresponds to one of the particular labels. Whether an atomic counter is incremented in response to receipt of an unlabeled packet may be controlled via the TCAM logic associated with the atomic counter. If the TCAM is set to apply a criteria requiring a label, the label-specific packet counters will not be incremented in response to receipt of an unlabeled packet, but otherwise, if this criteria isn't applied at the TCAM, one of the label-specific packet counter will increment in response to receipt of unlabeled packets(s) as just described.

Leaf-Spine Network Architectures Versus Traditional Network Architectures

A. Overview of Traditional "Access-Aggregation-Core" Network Architectures

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B.

Figure 5:
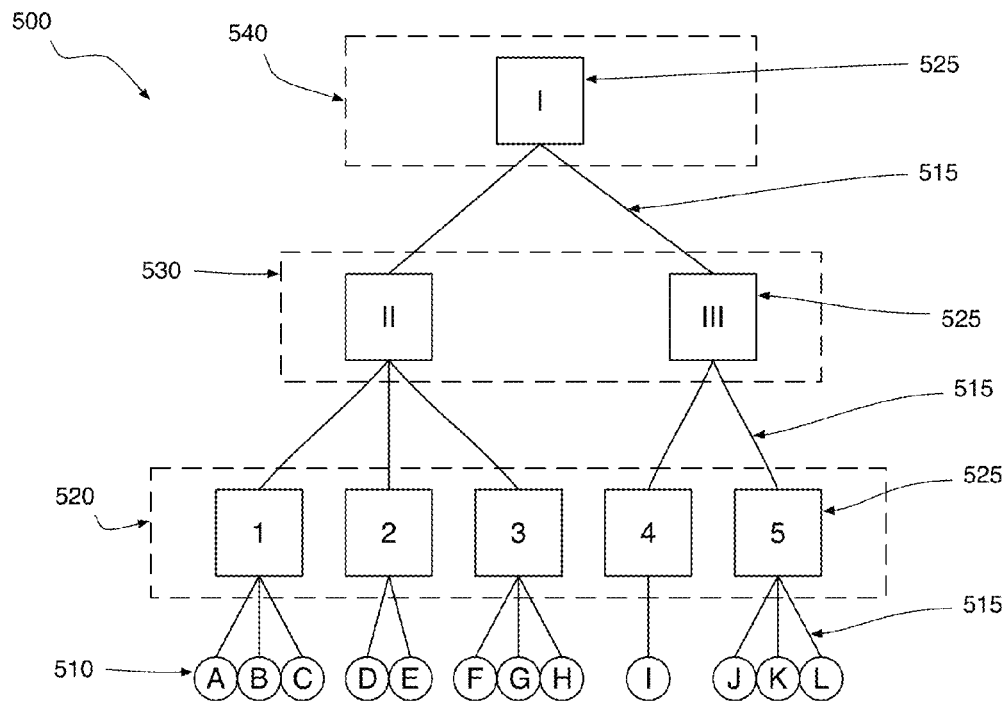
FIG. 5 schematically illustrates a simple network made up of 12 end devices which, following the "access-aggregation-core" (AAC) model, are connected through an access tier, an aggregation tier, and a top-level core tier.

FIG. 5 schematically illustrates a simple network 500 made up of 12 "end devices" 510 (e.g., servers) which, following the "access-aggregation-core" (AAC) model, are connected through an access tier 520, an aggregation tier 530, and a top-level core tier 540. Within each tier are "network devices" 525 (e.g., ethernet switches) each of which controls flow of network traffic over various "links" 515 (e.g., ethernet cable) between it and the other network devices 525 and ultimately to and from end devices 110. As shown in FIG. 5, it is access tier 520 which provides each end device 510 with immediate access to the network. From there, traffic may pass to the aggregation tier 530, and then to the core tier 540, depending on its final destination. It is noted that for traffic whose final destination is within the network 500 shown in FIG. 5, how far up the hierarchy the traffic must be directed to reach this destination depends on the location of the destination within the network. Traffic whose final destination is outside the network shown in FIG. 5—e.g., to some server on the worldwide intenet—will typically travel all the way up the hierarchy, since the connection or connections to the outside internet typically reside in the core tier. It is also noted that while FIG. 5 portrays each network device 525 identically for purposes of illustration, actual hardware implementations of such devices may possess substantial differences depending on whether the device is located in the access tier 520, the aggregation tier 530, or the core tier 540. For one thing, the single network device in the core tier 540 of FIG. 5 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 510 refers to a device connected to the network which is identified on the network and uses the network to communicate with other devices connected to the network. As such, the end device 510 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 510 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 5 illustrates the hierarchal connectivity of a access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 5, the end devices 510 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

Shared usage of links and network devices (such as just described) leads to bottlenecks in a network exhibiting a tree structure architecture like the access-aggregation-core (AAC) network shown in FIG. 5. For sake of simplicity, assume that in a given AAC network, data transmission over each link and through each network device is limited to the same maximum data transmission rate, and that each end device on this network can send and receive data at this maximum rate as well. In other words, the same bandwidth limitation applies to the whole network. If this is so, then referring again to FIG. 5, end devices A and B are able to communicate at full bandwidth, while end devices I and J are also communicating at full bandwidth. However, to use the previous example, if end device A attempts to communicate with end device K while end device I is communicating with end device J, then "blocking" occurs—e.g., either both pairs of end devices communicate at half maximum bandwidth, or they communicate at full bandwidth sequentially, one pair waiting for the other pair to finish. Obviously, the situation becomes much worse in a AAC network if many end devices which are topologically-separate from each other (i.e., their communication paths involve many links) attempt to simultaneously communicate with one another at full bandwidth.

Though the blocking problem is an inevitable consequence of the tree-structure paradigm, various solutions have been developed within this paradigm to lessen the impact of the problem. One technique is to build redundancy into the network by adding additional links between high traffic nodes in the network. In reference to FIG. 5, this might mean adding extra links between the core tier network device I, and the aggregation tier network devices II and III. Split-etherchannel and the like are examples implementing such an approach. Alternatively, instead of adding more links, standard-bandwidth links may be replaced by higher-bandwidth links, but the effect is essentially the same, albeit the consequences of link failure will be more severe versus having redundant links. With regards to link failure, it is noted in reference to FIG. 5 that even if redundant links are employed between the core and aggregation tiers, 1 link failure out of 4 in this simple example would reduce the network's bisectional bandwidth by a factor of 2. ("Bisectional bandwidth" is discussed in detail below.) Thus, it is evident that even with built-in redundancy, a tree-structured network architecture has inherent limitations, and, of course, there are costs associated with implementing hardware-based redundancy.

B. "Leaf-Spine" Network Architectures

Another way of addressing the ubiquitous "blocking" problem manifested in the modern datacenter's networking infrastructure is to design a new network around a topological paradigm where blocking does not present as much of an inherent problem. One such topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

Roughly speaking, leaf-spine networks lessen the blocking problem experienced by traditional networks by being less hierarchical and, moreover, by including considerable active path redundancy. In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form consists of two-tiers, a spine tier and leaf tier. Network devices within the leaf tier—i.e. "leaf network devices"—provide connections to all the end devices, and network devices within the spine tier—i.e., "spine network devices"—provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

Figure 6:
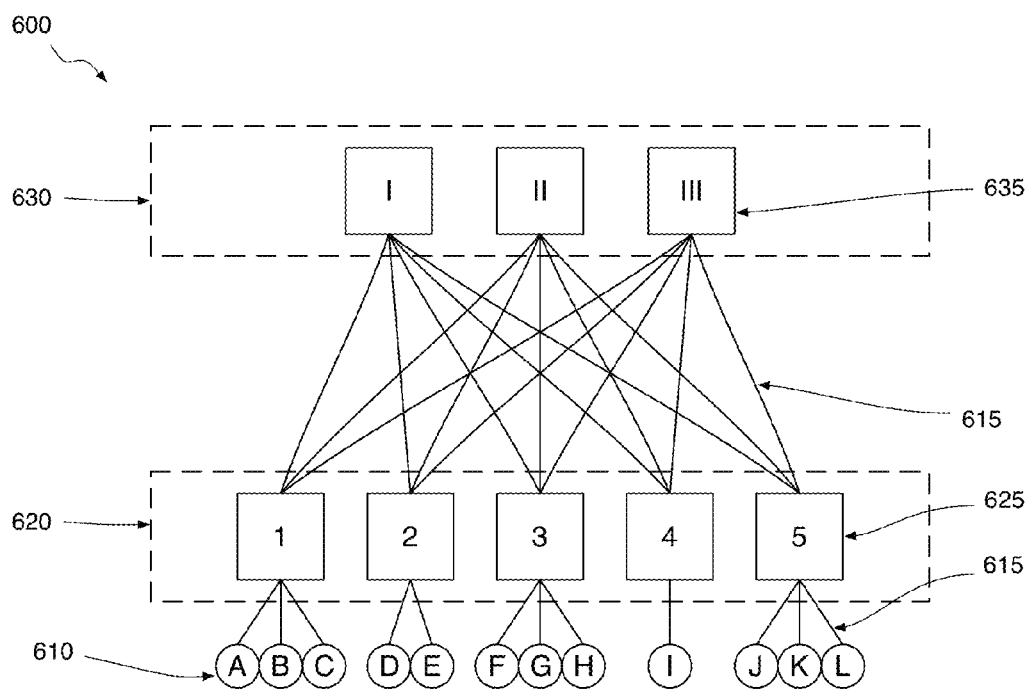
FIG. 6 schematically illustrates a particular example of a basic leaf-spine network.

FIG. 6 schematically illustrates a particular example of a basic leaf-spine network 600. To a certain extent, network 600 is analogous (or is the counterpart of) the AAC network 500 shown in FIG. 5. Both provide connectivity for 12 end devices which directly connect to 5 network devices in a first tier, in the case of network 600, to the 5 leaf network devices 625 of leaf tier 620, which are analogous to the 5 network devices 525 of the access tier 520 of the AAC network 500. However, moving on to the second tier, unlike the AAC network 500 which has a 2-network device aggregation tier 530 and a 1-network device core tier 540, the leaf-spine network 600 employs just a single additional tier, the spine tier 630, which consists of 3 spine-network devices 635.

Though in FIGS. 5 and 6 the total number of network devices in the higher tiers remains the same, the connectivity of these devices is quite different. FIG. 6 shows that in a prototypical leaf-spine network, every leaf network device 625 is connected to multiple spine network devices 635 creating the so-called "multi-rooted tree" topology—differing from the ordinary tree topology of an AAC network where each network device is connected to only one network device above it in the hierarchy. As a consequence and unlike an AAC network, in a leaf-spine network there are multiple paths of communication between any pair of leaf network devices 625, and thus also between any pair of end devices 610 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network

500. As shown in FIG. 6, in the leaf-spine network 600, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

As a second example, consider the scenario of simultaneous communication between end devices A and F and between end devices B and G which will clearly also lead to blocking in AAC network 500. In the leaf-spine network 600, although two leaf network devices 625 are shared between the four end devices 610, specifically network devices 1 and 3, there are still three paths of communication between these two devices (one through each of the three spine network devices I, II, and III) and therefore there are three paths collectively available to the two pairs of end devices. Thus, it is seen that this scenario is also non-blocking (unlike FIG. 5) because each pair of end devices still has access to 1.5 times the bandwidth required for max rate communication.

As a third example, consider the scenario of simultaneous communication between three pairs of end devices—between A and F, between B and G, and between C and H. In AAC network 500, this results in each pair of end devices having ⅓ the bandwidth required for full rate communication, but in leaf-spine network 600, once again, since 3 paths are available, each pair has exactly the bandwidth it needs for full rate communication. Thus, in a leaf-spine network having single links of equal bandwidth connecting devices, as long as the number of spine network devices 635 is equal to or greater than the number of end devices 610 which may be connected to any single leaf network device 625, then the network will have enough bandwidth for simultaneous full-rate communication between the end devices connected to the network.

More generally, the extent to which a given network is non-blocking may be characterized by the network's "bisectional bandwidth," which is determined by dividing a network that has N end devices attached to it into 2 equal sized groups of size N/2, and determining the total bandwidth available for communication between the two groups. If this is done for all possible divisions into groups of size N/2, the minimum bandwidth over all such divisions is the "bisectional bandwidth" of the network. Based on this definition, a network may then be said to have "full bisectional bandwidth" and have the property of being "fully non-blocking" if each leaf network device's total uplink bandwidth to the spine tier 630 (the sum of the bandwidths of all links connecting the leaf network device 625 to any spine network device 635) is at least equal to the maximum downlink bandwidth to end devices associated with any of the leaf network devices on the network.

To be precise, when a network is said to be "fully non-blocking" it means that no "admissible" set of simultaneous communications between end devices on the network will block—the admissibility constraint simply meaning that the non-blocking property only applies to sets of communications that do not direct more network traffic at a particular end device than that end device can accept as a consequence of its own bandwidth limitations. Whether a set of communications is "admissible" may therefore be characterized as a consequence of each end device's own bandwidth limitations (assumed here equal to the bandwidth limitation of each end device's link to the network), rather than arising from the topological properties of the network per se. Therefore, subject to the admissibility constraint, in a non-blocking leaf-spine network, all the end devices on the network may simultaneously communicate with each other without blocking, so long as each end device's own bandwidth limitations are not implicated.

The leaf-spine network 600 thus exhibits full bisectional bandwidth because each leaf network device has at least as much bandwidth to the spine tier (i.e., summing bandwidth over all links to spine network devices) as it does bandwidth to the end devices to which it is connected (i.e., summing bandwidth over all links to end devices). To illustrate the non-blocking property of network 600 with respect to admissible sets of communications, consider that if the 12 end devices in FIG. 6 are arbitrarily divided into 6 pairs, simultaneous communications between the 6 pairs are admissible, and thus may occur without blocking in network 600. In addition, it is noted that the non-blocking property of leaf-spine network 600 will be preserved if up to 15 end devices are connected, 3 to each of the 5 leaf network devices.

To implement leaf-spine network 600, the leaf tier 620 would typically be formed from 5 ethernet switches of 6 ports or more, and the spine tier 630 from 3 ethernet switches of 5 ports or more. The number of end devices which may be connected is then the number of leaf tier switches j multiplied by ½ the number of ports n on each leaf tier switch, or ½·j·n, which for the network of FIG. 6 is ½·5·6=15. Furthermore, the number of ports m on each spine tier switch is equal to the number of leaf tier switches j (so long as the maximum number of leaf tier switches are used), and so the total number of end devices is also given by ½·m·n, where m is the number of ports on the spine tier switches, and n is the number of ports on the leaf tier switches.

However, not every network is required to be non-blocking and, depending on the purpose for which a particular network is built and the network's anticipated loads, a fully non-blocking network may simply not be cost-effective. Nevertheless, leaf-spine networks still provide advantages over traditional networks, and they can be made more cost-effective, when appropriate, by reducing the number of devices used in the spine tier, or by reducing the link bandwidth between individual spine and leaf tier devices, or both. In some cases, the cost-savings associated with using fewer spine-network devices can be achieved without a corresponding reduction in bandwidth between the leaf and spine tiers by using a leaf-to-spine link speed which is greater than the link speed between the leaf tier and the end devices. If the leaf-to-spine link speed is chosen to be high enough, a leaf-spine network may still be made to be fully non-blocking—despite saving costs by using fewer spine network devices.

The extent to which a network having fewer spine tier devices is non-blocking is given by the ratio of bandwidth from leaf network device to spine tier versus bandwidth from leaf network device to end devices. By adjusting this ratio, an appropriate balance between cost and performance can be dialed in. In FIG. 600, for example, assuming links have equal bandwidth, one spine network device 635 could be eliminated if a non-blocking ratio of 2/3 was acceptable. This would imply that if 3 end devices connected to a single leaf network device attempt simultaneous communication to 3 or more end devices attached to other leaf networking devices, only ⅔ of the required bandwidth would be available. This is also referred to as "oversubscription." In this case, the "oversubscription rate" would be 1.5, since $1.5 = (⅔)^{-1}$.

This concept of oversubscription and building cost-effective networks having fewer than optimal spine network devices also illustrates the improved failure domain provided by leaf-spine networks versus their traditional counterparts. In a traditional AAC network, if a device in the aggregation tier fails, then every device below it in the network's hierarchy will become inaccessible until the device can be restored to operation. Furthermore, even if redundancy is built-in to that particular device, or if it is paired with a redundant device, or if it is a link to the device which has failed and there are redundant links in place, such a failure will still result in a 50% reduction in bandwidth, or a doubling of the oversubscription. In contrast, redundancy is intrinsically built into a leaf-spine network and such redundancy is much more extensive. Thus, as illustrated by the usefulness of purposefully assembling a leaf-spine network with fewer spine network devices than is optimal, absence or failure of a single device in the spine (or link to the spine) will only typically reduce bandwidth by 1/k where k is the total number of spine network devices.

It is also noted once more that in some networks having fewer than the optimal number of spine network devices (e.g., less than the number of end devices connecting to the leaf network devices), the oversubscription rate may still be reduced (or eliminated) by the use of higher bandwidth links between the leaf and spine network devices relative to those used to connect end devices to the leaf network devices.

C. Example "Leaf-Spine" Network Architecture

The following describes a sample implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s—i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices ('downlink ports') and some fraction are used to connect to spine network devices ('uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports.

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 50 to 150 ports, or more specifically from 64 to 128 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000 GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

D. Leaf-Spine Network Architectures Formed from More than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

One simple example of a 3-tier leaf-spine network may be built from just 4-port switches and this is schematically illustrated in FIGS. 7A-1, 7A-2, and 7B, in order to convey the general principle. Of course, it is to be understood that to build a large 3-tier network, larger switches would be employed. FIG. 7A-1 shows 4 4-port switches 722 (labeled "1-1," "1-2," "1-3," "1-4") connected to form a 2-tier leaf-spine network 701 for connecting 4 end devices 710 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 710, connected through 2 spine-network devices and 4 leaf network devices, but here, half the ports on the switches serving as spine network devices, switches 1-3 and 1-4, have their links pointed upward in FIG. 7A-1 to schematically indicate these links are reserved for uplink connection to a third tier. With the 4 4-port switches 722 connected in this manner, they may collectively be viewed as functioning as an 8 port switch 725, as schematically illustrated in FIG. 7A-2 (and labeled "1"), with 4 downlinks 705 to potential end devices 710 and 4 uplinks 715 to a potential third tier. Such an effective 8-port switch may then serve as a building-block for a 3-tier leaf-spine network.

FIG. 7B then shows how a 3-tier leaf-spine network 702 may be assembled from these 8-port building blocks. As shown in the figure, 4 8-port building blocks 725 may effectively serve as 4 leaf-network devices (labeled "1," "2," "3," "4,") in the leaf tier 720 of network 702. The spine tier 730 of network 702 is formed from 4 additional 4-port switches 735 (labeled "I," "II," "III," "IV"), similar to those used to form each 8-port leaf network device 725. Thus, when viewed in terms of 4-port switches, network 702 consists of 3 tiers with 8 4-port switches in the bottom tier, 8 4-port switches in the middle tier, and 4 4-port switches in the top tier, though this network may still be viewed as having a leaf tier 720 and spine tier 730, as just described. It is seen in the figure, that network 702 may connect up to 16 end devices 710. Generalizing this, it is noted that a 3-tier leaf-spine network may connect a total number of end devices equal to $\frac{1}{4} \cdot l \cdot m \cdot n$, where l, m, and n are the number of ports in the devices forming the top, middle, and bottom tiers, respectively (e.g., in FIG. 7B, $\frac{1}{4} \cdot 4 \cdot 4 \cdot 4 = 16$). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

OTHER EMBODIMENTS

Although the foregoing disclosed processes, methods, systems, and apparatuses have been described in detail within the context of specific embodiments for the purpose of promoting clarity and understanding, it will be apparent to one of ordinary skill in the art that there are many alternative ways of implementing these processes, methods, systems, and apparatuses which are within the scope and spirit of this disclosure. Accordingly, the embodiments described herein are to be viewed as illustrative of the disclosed inventive concepts rather than limiting or restrictive, and are not to be used as an impermissible basis for unduly limiting the scope of the appended Claims.

The invention claimed is:

1. A method of determining a statistic descriptive of the packets received at a particular location on a network out of a set of packets transmitted on the network, the method comprising:
   (a1) transmitting a first group of packets on the network, each packet in the first group labeled with a first label;
   (a2) transmitting a second group of packets on the network, each packet in the second group labeled with a second label, wherein the packets in the second group are not in the first group;
   (b1) incrementing a first packet counter associated with a particular network location in response to a packet or packets in the first group being received at the particular network location until all packets in the first group have drained from the network;
   (b2) incrementing a second packet counter associated with the particular network location in response to a packet or packets in the second group being received at the particular network location until all packets in the second group have drained from the network;
   (c1) after (b1), reading the value of the first packet counter;
   (c2) after (b2), reading the value of the second packet counter;
   (d) using the values read from the first and second packet counters in (c1) and (c2) to determine a statistic indicative of the number of packets or bytes received at the particular location on the network out of the total number of packets or bytes in the first and second groups transmitted on the network; and
   (e) assessing packet flow across the network using the statistic indicative of the number of packets or bytes received at the particular location on the network out of the total number of packets or bytes in the first and second groups transmitted on the network.

2. The method of claim 1, wherein (a2) is performed after (a1).

3. The method of claim 2, further comprising:
(a3) after (c1), transmitting a third group of packets on the network, each packet in the third group labeled with the first label;
(a4) after (c2) and (a3), transmitting a fourth group of packets on the network, each packet in the fourth group labeled with the second label;
(b3) incrementing the first packet counter associated with the particular network location in response to a packet or packets in the third group being received at the particular network location until all packets in the third group have drained from the network;
(b4) incrementing the second packet counter associated with the particular network location in response to a packet or packets in the fourth group being received at the particular network location until all packets in the fourth group have drained from the network;
(c3) after (b3), reading the value of the first packet counter;
(c4) after (b4), reading the value of the second packet counter; and
(e) using the values read from the first and second packet counters in (c1), (c2), (c3), and (c4) to determine a statistic descriptive of the packets received at the particular network location out of those in the first, second, third, and fourth groups transmitted on the network.

4. The method of claim 1, wherein:
in (b1), the first packet counter is incremented by a number indicative of the amount of data received in a packet or packets having the first label; and
in (b2), the second packet counter is incremented by a number indicative of the amount of data received in a packet or packets having the second label.

5. The method of claim 4, wherein:
in (b1), the number indicative of the amount of data received in a packet or packets having the first label is the number of bytes contained in the packet or packets having the first label;
in (b2), the number indicative of the amount of data received in a packet or packets having the second label is the number of bytes contained in the packet or packets having the second label; and
the statistic is indicative of the number of bytes received at the particular location on the network out of the total number of bytes in the first and second groups of packets transmitted on the network.

6. The method of claim 1, wherein the packets are encapsulated and the packet header providing the encapsulation carries either the first or second label.

7. The method of claim 1, further comprising:
(a3) transmitting a third group of packets on the network, each packet in the third group labeled with a third label, wherein the packets in the third group are not in either the first or second groups;
(b3) incrementing a third packet counter associated with the particular network location in response to a packet or packets in the third group being received at the particular network location until all packets in the third group have drained from the network;
(c3) after (b3), reading the value of the third packet counter; and
wherein in (d), the value read from the third packet counter in (c3) is also used in determining the statistic.

8. The method of claim 7, further comprising:
(a4) transmitting a fourth group of packets on the network, each packet in the fourth group labeled with a fourth label, wherein the packets in the fourth group are not in either the first, second, or third groups;
(b4) incrementing a fourth packet counter associated with the particular network location in response to a packet or packets in the fourth group being received at the particular network location until all packets in the fourth group have drained from the network;
(c4) after (b4), reading the value of the fourth packet counter; and
wherein in (d), the value read from the fourth packet counter in (c4) is also used in determining the statistic.

9. The method of claim 1, wherein the statistic is particularly descriptive of the packets matching a particular criteria received at the particular network location, and wherein:
the first packet counter is only incremented in (b1) if the packet or packets in the first group match the criteria; and
the second packet counter is only incremented in (b2) if the packet or packets in the second group match the criteria.

10. The method of claim 9, wherein the criteria is whether a packet's header designates a particular source IP address.

11. The method of claim 9, wherein the criteria is whether a packet's header designates a particular destination IP address.

12. The method of claim 9, wherein the criteria is whether a packet's header designates a particular port number.

13. The method of claim 9, wherein the criteria is whether the packet's header designates a particular virtual network identifier.

14. The method of claim 13, wherein the particular network location coincides with the location of a switch on the network.

15. The method of claim 1, the statistic being further indicative of the number of packets or bytes dropped out of the total number of packets or bytes in the first and second groups transmitted on the network.

16. The method of claim 1, wherein the network is a leaf-spine network.

17. The method of claim 1, further comprising:
determining that all packets in the first group have drained from the network; and
determining that all packets in the second group have drained from the network.

18. A network device for sending and receiving packets of data on a network, the network device comprising:
a plurality of ports through which packets of data are sent and received;
one or more packet labelers for labeling packets with a label from a set of labels before sending the packets out through the plurality of ports, the set of labels comprising:
a first label, and
a second label;
a first packet counter which increments in response to the network device receiving a packet or packets having the first label through one of the plurality of ports until all packets having the first label have drained from the network;
a second packet counter which increments in response to the network device receiving a packet or packets having the second label through one of the plurality of ports until all packets having the second label have drained from the network;

packet characterization logic which reads values from the first and second packet counters and uses the values to determine a statistic indicative of the number of packets or bytes received by the network device out of the total number of packets or bytes having the first or second label that are transmitted on the network; and a diagnostic tool that assesses packet flow across the network using the statistic indicative of the number of packets or bytes received at the particular location on the network out of the total number of packets or bytes in the first and second groups transmitted on the network.

19. The network device of claim 18, wherein:
the first packet counter increments by a number indicative of the amount of data received in a packet or packets having the first label; and
the second packet counter increments by a number indicative of the amount of data received in a packet or packets having the second label.

20. The network device of claim 19, wherein:
the number indicative of the amount of data received in a packet or packets having the first label is the number of bytes contained in the packet or packets having the first label;
the number indicative of the amount of data received in a packet or packets having the second label is the number of bytes contained in the packet or packets having the second label; and
the statistic determined by the packet characterization logic is indicative of the number of bytes received by the network device.

21. The network device of claim 18:
wherein the set of labels further comprises a third label;
wherein the network device further comprises a third packet counter which increments in response to the network device receiving a packet or packets having the third label through one of the plurality of ports; and
wherein the packet characterization logic further reads values from the third packet counter, and further uses the value read from the third packet counter to determine the statistic.

22. The network device of claim 18, wherein the statistic determined by the packet characterization logic is particularly descriptive of the packets received by the network device which match a particular criteria, and wherein:
the first packet counter only increments when a received packet or packets having the first label match the criteria; and
the second packet counter only increments when a received packet or packets having the second label match the criteria.

23. The network device of claim 22, wherein the criteria is whether a packet's header designates a particular destination IP address.

24. The network device of claim 22, wherein the criteria is whether a packet's header designates a particular port number.

25. The network device of claim 22, wherein the criteria is whether the packet's header designates a particular virtual network.

26. The network device of claim 18, wherein the network device is a leaf network device in a leaf-spine network.

27. The network device of claim 18, wherein the network device is a spine network device in a leaf-spine network.

28. The network device of claim 22, wherein the criteria is whether a packet's header designates a particular source IP address.

29. A network for transmitting packets of data between a plurality of end devices, the network comprising:
two or more leaf network devices for connecting to the plurality of end devices;
two or more spine network devices for connecting to the leaf network devices;
one or more packet labelers for labeling packets with a label from a set of labels, the set of labels comprising:
a first label, and
a second label;
a first packet counter associated with a particular network device which increments in response to the network device receiving a packet or packets having the first label until all packets having the first label have drained from the network;
a second packet counter associated with the particular network device which increments in response to the network device receiving a packet or packets having the second label until all packets having the second label have drained from the network;
packet characterization logic configured to read values from the first and second packet counters and use the values to determine a statistic indicative of the number of bytes or packets received by the particular network device out of the total number of packets or bytes having the first or second label transmitted on the network; and
a diagnostic tool configured to assess packet flow across the network using the statistic indicative of the number of packets or bytes received at the particular location on the network out of the total number of packets or bytes in the first and second groups transmitted on the network.

30. The network of claim 29, wherein:
the first packet counter increments by a number indicative of the amount of data received in a packet or packets having the first label; and
the second packet counter increments by a number indicative of the amount of data received in a packet or packets having the second label.

31. The network of claim 30, wherein:
the number indicative of the amount of data received in a packet or packets having the first label is the number of bytes contained in the packet or packets having the first label;
the number indicative of the amount of data received in a packet or packets having the second label is the number of bytes contained in the packet or packets having the second label; and
the statistic determined by the packet characterization logic is indicative of the number of bytes received by the particular network device.

32. The network of claim 29, wherein the statistic determined by the packet characterization logic is particularly descriptive of the packets received by the particular network device which match a particular criteria, and wherein:
the first packet counter only increments when a received packet or packets having the first label match the criteria; and
the second packet counter only increments when a received packet or packets having the second label match the criteria.

33. The network of claim 32, wherein the criteria is whether a packet's header designates a particular source IP address.

34. The network of claim 32, wherein the criteria is whether a packet's header designates a particular destination IP address.

35. The network of claim 32, wherein the criteria is whether a packet's header designates a particular port number.

36. The network of claim 32, wherein the criteria is whether the packet's header designates a particular virtual network.

* * * * *